United States Patent
Wagner et al.

(10) Patent No.: US 6,580,440 B1
(45) Date of Patent: Jun. 17, 2003

(54) SYSTEM AND METHOD FOR AUTOMATICALLY CREATING AND UPDATING A GRAPHICAL USER INTERFACE

(75) Inventors: Samuel Joseph Wagner, Lilburn, GA (US); Gary Ray Young, Dunwoody, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/543,730

(22) Filed: Apr. 5, 2000

(51) Int. Cl.⁷ .............................................. G06F 15/00
(52) U.S. Cl. ...................................... 345/762; 345/764
(58) Field of Search .............................. 345/764, 781, 345/835, 810, 839, 840, 841, 744, 762; 707/3, 5, 4, 104

(56) References Cited

U.S. PATENT DOCUMENTS

| | | | | |
|---|---|---|---|---|
| 5,615,367 A | * | 3/1997 | Bennett et al. | 707/3 |
| 5,905,496 A | * | 5/1999 | Lau et al. | 345/764 |
| 5,920,312 A | | 7/1999 | Wagner et al. | |
| 6,002,395 A | | 12/1999 | Wagner et al. | |
| 6,073,148 A | * | 6/2000 | Rowe et al. | 345/471 |
| 6,356,899 B1 | * | 3/2002 | Chakrabarti et al. | 707/5 |

* cited by examiner

*Primary Examiner*—Cao (Kevin) Nguyen
(74) *Attorney, Agent, or Firm*—Priest & Goldstein, PLLC

(57) ABSTRACT

Techniques are described for implementing the automatic generation of a DynaKey™ GUI external file that is then used by the corresponding builder <B>, runtime <R>, and tester <T> systems. The automation begins by data-mining <D> a design document, screen-by-screen, to extract pertinent text, icon, static key, screen branching, and other necessary information. The data-mined file is then used to create a new GUI external interface file or to modify an existing interface file. During the process, information is provided in list boxes to insure the design document is free of errors as well as to provide a log of update modifications when an interface is modified. The list box contents can also be printed to allow for viewing an expanded version of the list box contents. Accordingly, many successive prototypes leading to the final production system can be implemented much more quickly and efficiently than with typical preexisting approaches.

16 Claims, 29 Drawing Sheets

DMRetail Series    Version 1.0    09/27/99

| Screen ID: | DP.1a | ScreenName: | DEPT | Last modification: | |
|---|---|---|---|---|---|
| Screen Set: | Dept | | | | |
| Reference Name: | DKItem2 | | | | |
| Task Description: | | | | | |
| Screen Access: | | | | | PreviousPage: |

251

| | | | Icon/.bmp | DynaKey Label | Properties |
|---|---|---|---|---|---|
| Customer Logo | Title area (left justify): Price/Department Entry | | GROCERY | ::70:Dept1 | NavigateWO: DP.1.1 |
| | Instructional area (left justify): Select or enter department number. | | | | |
| | | | LIQUOR | ::71:Dept2 | NavigateWO: DP.1.1 |
| Prompt area: Number: | Input area: | | | | |
| | | | FRUIT | ::72:Dept3 | NavigateWO: DP.1.1 |
| 1 Grocery Dept<br>2 Wne/Sp/Beer Dept<br>3 Produce Dept<br>4 Meat Dept<br>5 Bakery Dept<br>6 News Mags/Other<br>7 Home N Wear Dept<br>8 Toy Dept<br>9 Record Bar Dept<br>10 Tobacco<br>11 Coffee Shop<br>12 Staff Sales | | | STEAK_C | ::73:Dept4 | NavigateWO: DP.1.1 |
| | | | BAKEHO-1 | ::74:Dept5 | NavigateWO: DP.1.1 |
| | | | NEWSPR_C | ::75:Dept6 | NavigateWO: DP.1.1 |
| | Total: | | OFFICE_C | ::76:Dept7 | NavigateWO: DP.1.1 |
| Status area:<br>Cashier: <Cashier Number>    <mm/dd/yy><br>Register: <Register Number>    <hh/mm (am/pm)> | | | SPORTS_C | ::77:Dept8 | NavigateWO: DP.1.1 |

| | Static Key Col.1 | Properties | Static Key Col.2 | Properties | Static Key Col.3 | Properties |
|---|---|---|---|---|---|---|
| Row1 | Item-Entry | Valid | Menu | Valid | Sign-Off | Valid |
| Row2 | Coupons | Valid | Dept | Invalid | Lookup-PLU | Valid |
| Row3 | Clear | Valid | B'kspace-Cancel | Valid | Stamps &-V'chers | Invalid |
| Row4 | | | | | Cash-Back | Invalid |
| Row5 | | | | | Payment | Valid |
| Row6 | | | | | Enter | NavigateW: DP.1.1 NavigateWO: DP.1.1 |

∇Δ

FIG. 3B
Price/Department Entry
Select or enter department number
1.0(12)(DP.1a)(12)
Number: [ ]
| | |
|---|---|
| 1 Grocery Dept | Grocery Dept  |
| 2 Wne/Sp/Beer Dept | Wine/Sp/Beer Dept  |
| 3 Produce Dept | Produce Dept  |
| 4 Meat Dept | Meat Dept  |
| 5 Bakery Dept | Bakery Dept  |
| 6 News Items | News Items  |
| 7 Home N Wear Dept | Home N Wear Dept  |
| 8 Toy Dept | Toy Dept  |
| 9 Record Bar Dept | |
| 10 Tobacco | |
| 11 Coffee Shop | |
| 12 Staff Sales | |
Cashier: Pam
Register: 1
09/29/199
05:40 PM

FIG. 3C

Price/Department Entry
Select or enter department number
1.0(12)(DP.1a)(12)

Number: [        ]

| | |
|---|---|
| 1 | Grocery Dept |
| 2 | Wne/Sp/Beer Dept |
| 3 | Produce Dept |
| 4 | Meat Dept |
| 5 | Bakery Dept |
| 6 | News Items |
| 7 | Home N Wear Dept |
| 8 | Toy Dept |
| 9 | Record Bar Dept |
| 10 | Tobacco |
| 11 | Coffee Shop |
| 12 | Staff Sales |

◁ Top
▷ Bottom
◁◁ Fast Up
◁ Up
▷ Down
▷▷ FastDown

Cashier: Pam
Register: 1

```
"begin"
"   ScreenID:IE.1a"
"   Screen Set:Item-Entry"
"   Reference Name:DKItem"
"   Title:Item Entry"
"   Instruction1:Scan or enter PLU number."
"   Instruction2:"
"   EchoPrompt:PLU:"
"        DynakeyLabel 1:Change"
"                     :Quantity"
"        DynakeyLabel 2:Change"
"                     :Price"
"        DynakeyLabel 3:Void Item"
"        DynakeyLabel 4:Cancel Transaction"
"     DynakeyIconBmp 1:QUANTI~1"
"     DynakeyIconBmp 2:PRICE_C"
"     DynakeyIconBmp 3:VOID_C"
"     DynakeyIconBmp 4:VOIDTR~1"
"       DynakeyBranch 1:NavigateW:"
"                      :IE.1a"
"                      :NavigateWO:"
"                      :IE.1.1"
"       DynakeyBranch 2:NavigateW:"
"                      :IE.1a"
"                      :NavigateWO:"
"                      :IE.1.2"
"       DynakeyBranch 3:NavigateWO:"
"                      :IE.1a"
"       DynakeyBranch 4:NavigateWO:"
"                      :IE.1.3"
"        Static Label 01:Item-Entry"
"     Static Property 01:Invalid"
"        Static Label 02:Coupons"
"     Static Property 02:Valid"
"        Static Label 03:Clear"
"     Static Property 03:Valid"
"        Static Label 04:Menu"
"     Static Property 04:Valid"
"        Static Label 05:Dept"
"     Static Property 05:Valid"
"        Static Label 06:B'kspace-Cancel"
"     Static Property 06:Valid"
"        Static Label 07:Sign-Off"
"     Static Property 07:Valid"
"        Static Label 08:Lookup-PLU"
"     Static Property 08:Valid"
"        Static Label 09:Stamps &-V'chers"
"     Static Property 09:Invalid"
"        Static Label 10:Cash-Back"
"     Static Property 10:Invalid"
"        Static Label 11:Payment"
"     Static Property 11:Valid"
"                 Enter:NavigateW:"
"                      :IE.1a"
"                      :PW.1a"
"   Page:5"
"end"
```

Data-mined segment for FIG. 2A

FIG. 5A

```
0,STATICKEY,iStaticNum,iStaticRow,iStaticCol,iFunctionW,iLowW,iHighW,iNextScreenPW,iNextScreenAW,
  usBlackboardW,iFunctionWO,iNextScreenPWO,iNextScreenAWO,usBlackboardWO
1,TEXT,iScreenNum,iTitle,chTitleIcon,iInstr1,iInstr2,iInstr3,iScreenType,iListNum,iLastScreen,iLastButton,iPrompt1,iPrompt2
2,DYNAKEY,iButton,iLabel1,iLabel2,chIcon,bEnable,iFunctionW,iLowW,iHighW,iNextScreenPW,iNextScreenAW,
  usBlackboardW,iFunctionWO,iNextScreenPWO,iNextScreenAWO,usBlackboardWO
3,ENVIRONMENT,bScan,bScale,bMsr,bMicr,bOut,bNull,bKey,bEcho,bReceipt,bTotal,bKey11,bKey12,...bKey33,bKey43,bKey53
4,ENTER,SCANNER,MSR,MICR,FORM_EMPTY,NULL_ACTION,iRelative,iFunctionW,iLowW,iHighW,iNextScreenPW,
  iNextScreenAW,usBlackboardW,iFunctionWO,iNextScreenPWO,iNextScreenAWO,usBlackboardWO 0,1,1,4,1,10,0,0,81,5,0,0
0,2,2,1,4,1,10,0,0,81,11,0,0
0,3,3,1,80,1,10,0,0,0,81,0,0,0
0,4,1,2,4,1,10,0,0,81,10,0,0
0,5,2,2,4,1,10,0,0,0,81,12,0,0
0,6,3,24,1,10,0,0,81,0,0,0
0,7,1,3,4,1,10,0,0,81,4,0,0
0,8,2,3,4,1,10,0,0,81,14,0,0
0,9,3,3,4,1,10,0,0,81,28,0,0
0,10,4,3,4,1,10,0,0,0,81,27,0,0
0,11,5,3,4,1,10,0,0,81,16,0,0
1,5,19,NA,20,0,22,1,0,-1,-1,21,0
2,1,23,24,QUANTI~1,T,76,1,10,5,0,0,77,6,0,0
2,2,25,26,PRICE_C,T,76,1,10,5,0,0,77,7,0,0
2,3,27,0,VOID_C,T,0,1,10,0,0,77,5,0,0
2,4,28,0,VOIDTR~1,T,0,1,10,0,0,0,77,8,0,0
3,F,F,F,F,F,T,F,F,F,T,T,T,T,T,T,F,F,T
4,178,1,10,5,0,4,3,0,0,0
```

501  502  503  504  505  506

Prototype:Subset Of "autopos.csv" External Interface File Corresponding To FIG. 2A

```
0,STATICKEY,iStaticNum,iStaticRow,iStaticCol,iFunctionW,iFunctionWO,iLowW,iHighW,iNextScreenPW,iNextScreenPWO,iNextScreenAW,iNextScreenAWO,usBlackboardW,usBlackboardWO
1,TEXT,iScreenNum,iTitle,chTitleIcon,iInstr1,iInstr2,iInstr3,iScreenType,iListNum,iLastScreen,iLastButton,iPrompt1,iPrompt2,iFunctionW,iFunctionWO,iLowW,iHighW,iNextScreenPW,iNextScreenPWO,iNextScreenAW,iNextScreenAWO,usBlackboardW,usBlackboardWO
2,DYNAKEY,iButton,iLabel1,iLabel2,chIcon,bEnable,iFunctionW,iFunctionWO,iLowW,iHighW,iNextScreenPW,iNextScreenPWO,iNextScreenAW,iNextScreenAWO,usBlackboardW,usBlackboardWO
3,ENVIRONMENT,bScan,bScale,bMsr,bMicr,bOut,bNull,bKey,bEcho,bReceipt,bTotal,bKey11,bKey12,...,bKey33,bKey43,bKey53
4,ENTER,SCANNER,MSR,MICR,FORM_EMPTY,NULL_ACTION,iRelative,iFunctionW,iLowW,iHighW,iNextScreenPW,iNextScreenPWO,iNextScreenAW,usBlackboardW,iFunctionWO,iNextScreenPWO,iNextScreenWO,usBlackboardWO
0,1,1,1,4,1,10,0,0,0,128,5,0,0
0,2,2,1,4,1,10,0,0,0,126,11,0,0
0,3,3,1,124,1,10,0,0,0,125,0,0,0
0,4,1,2,4,1,10,0,0,0,130,10,0,0
0,5,2,2,4,1,10,0,0,0,127,12,0,0
0,6,3,2,121,1,10,0,0,0,122,0,0,0
0,7,1,3,4,1,10,0,0,0,132,4,0,0
0,8,2,3,4,1,10,0,0,0,129,14,0,0
0,9,3,3,4,1,10,0,0,0,133,28,0,0
0,10,4,3,4,1,10,0,0,0,123,27,0,0
0,11,5,3,4,1,10,0,0,0,131,16,0,0
1,5,19,NA,20,0,22,1,0,-1,-1,21,0
2,1,23,24,QUANTI~1,T,99,1,4,5,0,0,100,6,0,0
2,2,25,26,PRICE_C,T,101,1,4,5,0,0,102,7,0,0
2,3,27,0,VOID_C,T,0,1,10,0,0,0,115,5,0,0
2,4,28,0,VOIDTR~1,T,0,1,10,0,0,0,86,8,0,0
3,T,F,F,F,F,T,T,F,F,F,T,T,T,T,T,T,F,F,T
4,1,103,1,13,5,0,4,3,0,0,0
4,2,0,0,0,0,0,111,5,0,4
```

Runtime: Subset Of "autopos.csv" External Interface File Corresponding To FIG. 2A

FIG. 5C

```
B'kspace,Cancel,3,2,0,0,0,-1
Cash,Back,4,3,0,0,0,27
Clear,NA,3,1,0,0,0,-1
Coupons,NA,2,1,0,0,0,11
Dept,NA,2,2,0,0,0,12
Item,Entry,1,1,1,0,0,5
Lookup,PLU,2,3,0,0,0,14
Menu,NA,1,2,0,0,0,10
Payment,NA,5,3,1,3,0,16
PLU_Weight,NA,0,0,1,2,0,9
Sign,Off,1,3,0,0,0,4
Sign_On,NA,0,0,1,1,1,1
Stamps &,V'chers,3,3,0,0,0,28
Not_Used,NA,0,0,1,4,0,-1
Not_Used,NA,0,0,1,5,0,-1
Not_Used,NA,0,0,1,6,0,-1
Not_Used,NA,0,0,1,7,0,-1
Not_Used,NA,0,0,1,8,0,-1
Not_Used,NA,0,0,1,9,0,-1
Not_Used,NA,0,0,1,10,0,-1
Not_Used,NA,0,0,1,11,0,-1
Not_Used,NA,0,0,1,12,0,-1
Not_Used,NA,0,0,1,13,0,-1
Not_Used,NA,0,0,1,14,0,-1
```

Prototype/Runtime: "autopos.key" External Interface File

FIG. 6A

| Date 09/25/99 | Time 08:15 AM | Item Entry 5 | | Page 6 |
|---|---|---|---|---|
| Item Entry (NA) | | w  Prototype_DynakeyW | 5 | 1-10 |
| | 1.QUANTI~1 | Change | | |
| Scan or enter PLU number. | | Quantity | | |
| | | w/0 Prototype_DynakeyWO | 6 | |
| PLU: | | w  Prototype_DynakeyW | 5 | 1-10 |
| | 2.PRICE_C | Change | | |
| 1.0(5)(IE.1A)(5) | | Price | | |
| | | w/0 Prototype_DynakeyWO | 7 | |
| | | w  A_Error_DataW | 0 | 1-10 |
| | 3. VOID_C | Void Item | | |
| | | w/0 Prototype_DynakeyWO | 5 | |
| | | w  A_Error_DataW | 0 | 1-10 |
| | 4. VOIDTR~1 | Cancel Transaction | | |
| | | w/0 Prototype_DynakeyWO | 8 | |
| | 5. | | | |
| | 6. | | | |
| | 7. | | | |
| | 8. | | | |
| | | w  Prototype_EnterW | * | 1-10 |
| | <ENTER> | | | |
| | | w/0 A_Error_EnterWO | 0 | |
| *     5\PLU_WEIGHT | | | | |
| | | DKITEM | | |

Prototype:Builder <B> Printout of FIG. 2A Information

FIG. 6B

| | | | |
|---|---|---|---|
| Date 09/25/99 | Time 09:15 AM Item Entry 5 | | Page 6 |

```
Item Entry (NA)                w   Sales_Change_QuantityW      5    1-4
                           1.QUANTI~1      Change
Scan or enter PLU number.                  Quantity
                               w/0 Sales_Change_Quantity       6

PLU:                           w   Sales_Change_Unit_PriceW    5    1-4
                           2.PRICE_C        Change
1.0(5)(IE.1A)(5)                            Price
                               w/0 Sales_Change_Unit_Price     7 w   A_Error_DataW               0    1-10
                           3. VOID_C        Void Item
                               w/0 Sales_Void_YesWO            5 w   A_Error_DataW               0    1-10
                           4. VOIDTR~1      Cancel Transaction
                               w/0 Sales_Cancel_TransactionWO  8

5.

6.

7.

8.

w   Sales_Enter_PLUW            *    1-13
              <ENTER>
                               w/0 A_Error_EnterWO             0 w   A_Error_DataW               0    1-10
              <Scanner Enable>
                               w/0 Sales_Scanner_PLUWO         *

*         5\PLU_WEIGHT
                                       DKITEM
```

Runtime:Builder <B> Printout of Fig. 2A Information

FIG. 7A

```
Sub FindTitle(chTitle$)
'
' FindTitle Subprogram
'
 Dim iLength As Integer

Selection.Find.ClearFormatting
  With Selection.Find
        .Text = "Title area (left justify):"
        .Replacement.Text = ""
        .Forward = True
        .Wrap = wdFindStop
        .Format = False
        .MatchCase = False
        .MatchWholeWord =
        .MatchWildcards = False
        .MatchSoundsLike = False
        .MatchAllWordForms = False
  End With
 Selection.Find.Execute
 Selection.HomeKey Unit:=wdLine
 Selection.MoveDownUnit:=wdLine, Count:=1
 Selection.EndKeyUnit:=wdLine, Extend:=wdExtend chTitle$ = Selection.Text
 If Len(chTitle$) > 1 Then
        iLength = Len(chTitle$) - 1
        chNewTitle$ = Left(chTitle$, iLength)
        chTitle$ = chNewTitle$
 End If Selection.HomeKey Unit:=wdLine
End Sub
```

VBA Title Extraction

SYSTEM AND METHOD FOR AUTOMATICALLY CREATING AND UPDATING A GRAPHICAL USER INTERFACE

CROSS REFERENCE TO RELATED PATENTS

The present patent application is related to U.S. Pat. No. 5,920,312 entitled "SYSTEM AND METHOD FOR BUILDING, TESTING, AND INTEGRATING A GRAPHICAL DYNAKEY™ USER INTERFACE", granted to Wagner, et. al. on Jul. 6, 1999, which is herein incorporated by reference in its entirety.

FIELD OF THE INVENTION

This invention relates generally to graphical user interfaces displayed on display screens, such as point-of-sale (POS) display screens. In particular, the present invention relates to advantageous methods for automating the process of designing, creating, updating and error checking graphical user interfaces (GUIs). The present invention utilizes automation techniques that directly link a screen interface design document, such as a Microsoft® Word document, with a runtime system by automating the storage of information that is encoded within an external interface file.

BACKGROUND OF THE INVENTION

The DynaKey™ is a POS peripheral device that provides the functionality of a keyboard input device and an output display combined in one physical package. The DynaKey™ has eight physical keys that are positioned along the right-hand side of an LCD screen. The DynaKey™ GUI associates each of these keys with an icon displayed to the immediate left of each physical key on the LCD screen. The icon that is displayed may be composed of a text label as well as a pictoral element, and may change with each new screen displayed on the LCD. These physical keys are known as DynaKeys™ due to this dynamic characteristic of the key's programmed function. The DynaKey™ also has other physical keys called global keys that are utilized primarily for switching from one group of screens to the first screen of another group. Additionally, the DynaKey™ has a numeric keypad that is utilized for data input, as well as two cursor keys that are utilized for scrolling through displayed screen data. The software utilized to program the DynaKey™ may be independent of the POS application itself, and is available from many sources under different names. One such object-oriented software product is the Advanced Store User Interface (ASUI). ASUI is easily incorporated into a Microsoft® Visual C++™ dialog-based program, and utilizes four common pre-defined retail screen design forms. Each form consists of a screen layout with controls for a title block, an instruction block, a prompt block, an input block, an electronic receipt block, a total's block and a status line block. The size and shape of each of these blocks is programmable, and occupy the left side of the screen layout. The right side of each screen layout contains the DynaKey™ text label and an icon for each of the eight DynaKeys™.

The development of a new POS application utilizing the DynaKey™ may require the design of hundreds of new screen layouts based upon the complexities of the POS application. The design of these screens, or GUI, involve combining the functional requirements of the application logic with visual design considerations that affect the application's usability. The design and maintenance of a POS application is an iterative process that may involve frequent changes to constant or variable text in individual or multiple screens, the addition of new screens, and changes to the branching between screens. Existing methods for designing DynaKey™-enabled POS applications are subject to errors because the visual screen designers and software engineers typically work in parallel to develop the POS application. Such errors are compounded as the POS application evolves through multiple prototype and production level iterations.

DynaKey™ GUI design has become much simpler and efficient with the use of Microsoft® Word 7.0. For example, a screen designer can now navigate from one screen to another quickly and easily. This is done via branching, and is implemented by utilizing hypertext links that are embedded within the screen design document, and that allow quick navigation from one screen to another. Such methods are disclosed by U.S. Pat. No. 5,920,312 entitled "System and Method for Building, Testing and Integrating a Graphical User Interface" which describes a system that utilizes a builder program, a tester program, and a runtime system that automates many of the operations required to develop DynaKey™-enabled POS application programs.

SUMMARY OF THE INVENTION

The present invention recognizes that there exists a need in a variety of contexts for a system and method for creating and updating display screens for use with a DynaKey™. Such a method should advantageously allow display screens to be created by data-mining screen design documents written utilizing a word processor such as Microsoft® Word, and utilizing the data-mined information to either create or update an existing graphical user interface file.

The method of data-mining is totally integrated by first invoking Microsoft® Word through the selection of an appropriate menu item within the Microsoft® Visual C++™ dialog-based program. After data-mining the screen design document, the Word document is closed, a second menu item is chosen for either creating or updating the interface file utilizing the data from the data-mined screen design document. Several advantages result from this process. First, Microsoft® Word provides a macro language called Visual Basic for Applications (VBA) that can be used to extract information before it is written to an external file. The VBA environment includes its own editor, and allows a user to utilize the macro-recorder to obtain VBA segments automatically. Second, an existing target language already exists for representing the external DynaKey™ interface design abstractly, and this work can serve as a starting point for finding the necessary and sufficient abstraction. For example, this language encompasses entry level logic (ELL) function designation and screen branching for Dyakeys™, peripheral input/output devices, and the <Enter> key. These functions are described in U.S. Pat. No. 5,920,312 entitled "System and Method for Building, Testing and Integrating a Graphical DynaKey™ User Interface". However, prior work in this area does not provide methods related to utilizing external file information relative to other global keys. Third, a new design document is disclosed in the present invention that enables visual screen designers to specify all the essential DynaKey™ screen information without requiring those individuals to possess or utilize computer programming skills.

It is an object of the present invention that the method of creating and updating the GUI file includes the step of utilizing rules to manipulate text statements that may contain too many characters or lines. A further object of the creating/updating process is to provide the user with warning and error messages via list boxes and optional printed text, as well as a log of update modifications and other useful information.

A further object of the present invention is to expand the external interface file capability to include ELL functions and branching for all of the static keys rather than just the <Enter> global key.

A further object of the present invention is to automate the process of specifying, within the screen design document, whether or not a given static key may be utilized for any given screen.

A further object of the present invention is to automate both the creation and modification of the screen set file (*.key), rather than the manual method of creating the screen set file utilizing a simple text editor as utilized by the prior art.

A final object of the present invention is to allow both the prototype dummy ELL and the production ELL function designations to co-exist in the external interface file such that the execution of the runtime system <R> permits total screen navigation and conditional variable text decoding. This holds true for the initial prototype where the ELL functions are protoype dummy ELL functions.

A more complete understanding of the present invention, as well as other features and advantages of the invention will be apparent from the following detailed description and the accompanying drawings.

BRIEF DESCRIPTION OF THE DRAWINGS

FIGS. 2A and 2B illustrate two examples of Microsoft® Word design documents associated with two DynaKey™ screens for use with a runtime system in accordance with the present invention;

FIGS. 3A through 3E illustrate examples of DynaKey™ screens displayed by the runtime stem (R);

FIG. 4 illustrates a portion of the printout of the readable data-mined file corresponding to the screen design document of FIG. 2A;

FIGS. 5A and 5B illustrate the interface file segment associated with FIG. 2A in both its prototype and runtime form;

FIG. 5C illustrates the interface file segment containing information for each screen category or set;

FIGS. 6A and 6B illustrate a printout of the visual design information associated with the screen design document of FIG. 2A, along with some additional information, as generated by the builder tool (B), for both the prototype and runtime forms;

FIG. 7A illustrates the title extraction function provided by VBA as applied to a Microsoft® Word screen design document;

DETAILED DESCRIPTION

The present invention will now be described more fully with reference to the accompanying drawings, in which currently preferred embodiments of the invention are shown. However, this invention may be embodied in various forms and should not be construed as limited to the exemplary embodiments set forth herein. Rather, the representative embodiments are described in detail so that this disclosure will be thorough and complete, and fully convey the scope, operation, functionality, structure and potential of applicability of the invention to those skilled in the art.

First, there exists a need in the art for a method of screen design that avoids duplication of effort between a visual screen designer and a software engineer. Eliminating duplicate or redundant work effort avoids errors and can save significant amounts of time and effort. The solution to this problem requires a method that will use the word-processing screen design document information to automatically place the screen title, instruction(s), input prompt, DynaKey™ labels, ™ icon names, static key names, static key screen eligibility, complex screen branching and entry level logic (ELL) function designations into an external file that can then be read by <R>.

Second, there exists a need for a method that maintains coordination of the above screen elements, as well as branches between screens, as the application proceeds through multiple iterations from initial prototype to the final runtime module.

The present invention discloses a data-mining tool <D> to address these two main problems. The first task accomplished in the data-mining process is to examine the *.doc screen design file, and then to write the pertinent information to disk. Subsequently, <D> must utilize this file to create or update the external GUI interface file information. This external GUI file information is then input by the runtime module <R> each time it is executed. <D> must also provide certain useful information to the visual screen designer via dialog list boxes. This information must provide the visual screen designer with appropriate error and warning messages relative to the individual screen designs. If an external interface is modified, then a log of the changes must be provided to the screen designer.

Figure 1A:
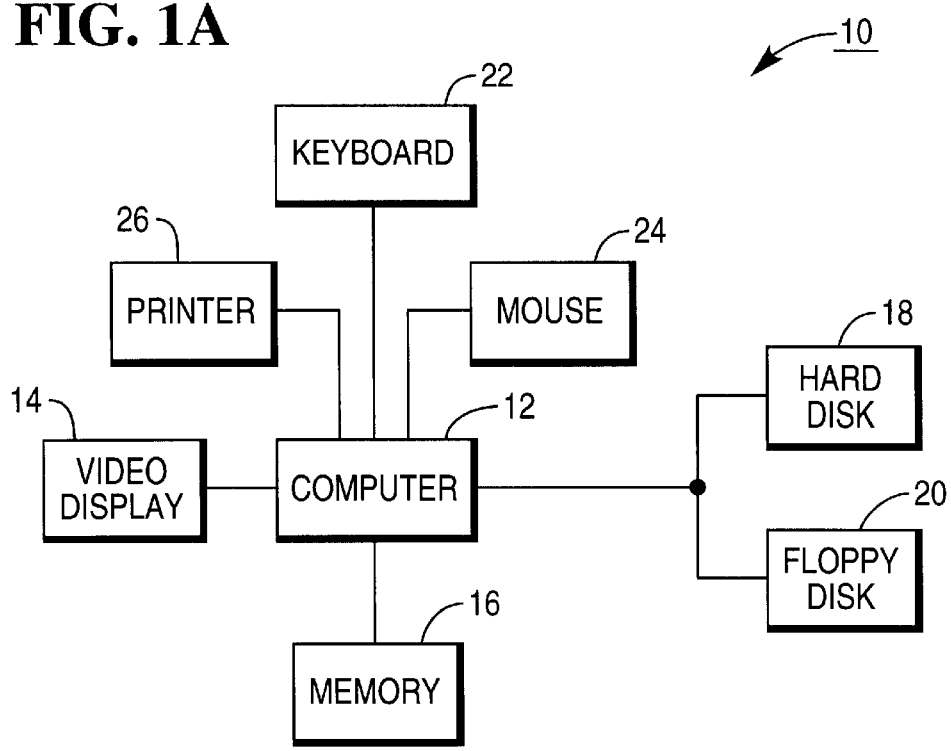
FIG. 1A illustrates a block diagram of a computer system in accordance with the present invention.

FIG. 1A illustrates a computer system 10 adapted for use in conjunction with the present invention as described further below. Computer system 10 comprises a computer 12, a video display device 14, a memory 16, a hard disk drive 18, a floppy disk drive 20, a keyboard 22, a mouse 24 and a printer 26. Computer system 10 is utilized for creating screen design documents. These design documents are then utilized to build, test, produce and maintain runtime modules necessary for developing a point-of-sale (POS) application for use with a DynaKey™. In the preferred embodiment, computer system 10 is configured as a typical application development system. Computer 12 is a Pentium®-class computer or its equivalent, video display device 14 is an SVGA CRT monitor or its equivalent, memory 16 is comprised of at least 32 MB of RAM and hard disk 18 has a capacity of at least 8 GB.

Figure 1B:
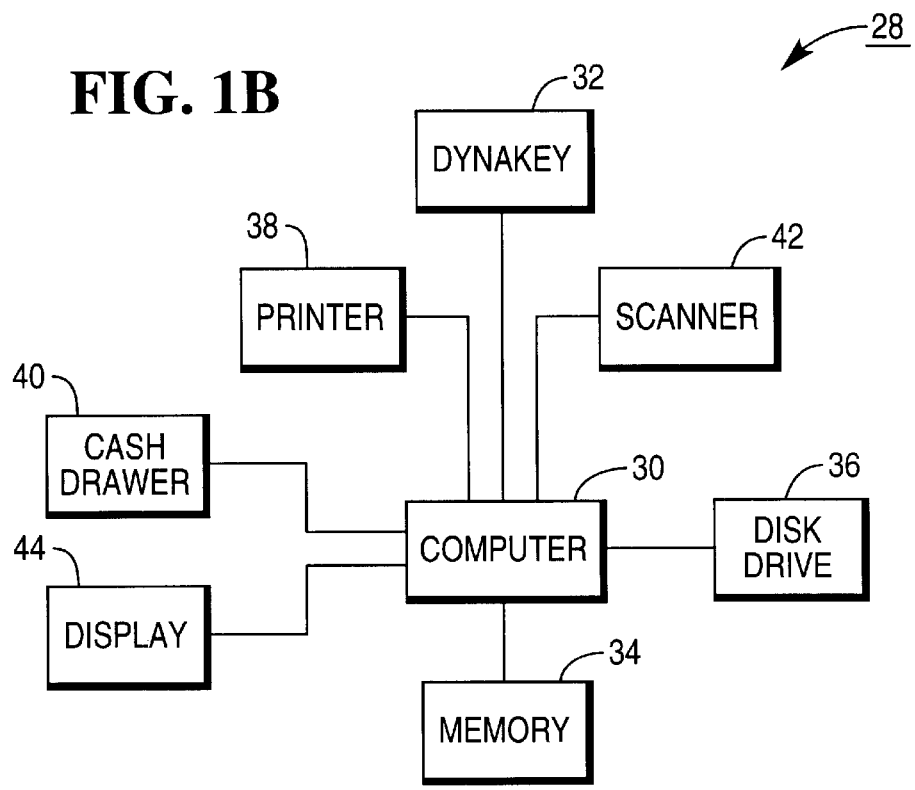
FIG. 1B illustrates a block diagram of a point-of-sale retail DynaKey™ system for use in conjunction with the present invention.

FIG. 1B illustrates a POS terminal 28 adapted for use in conjunction with the present invention as described further below. POS system 28 comprises a computer 30, a DynaKey™ 32, a memory 34 and a hard disk drive 36. POS system 28 may also include a receipt printer 38, a cash drawer 40, a bar code scanner 42 and 2×20 character customer display 44. In the preferred embodiment, POS terminal 28 is a DynaKey™-enabled POS terminal for use in retail and other point-of-service applications. Computer 30 is an NCR 7452 or other equivalent Intel-based PC, DynaKey™ 32 is a 10-inch or 12-inch diagonal color input/output device and memory 34 is comprised of at least 32 MB of RAM.

Figure 1C:
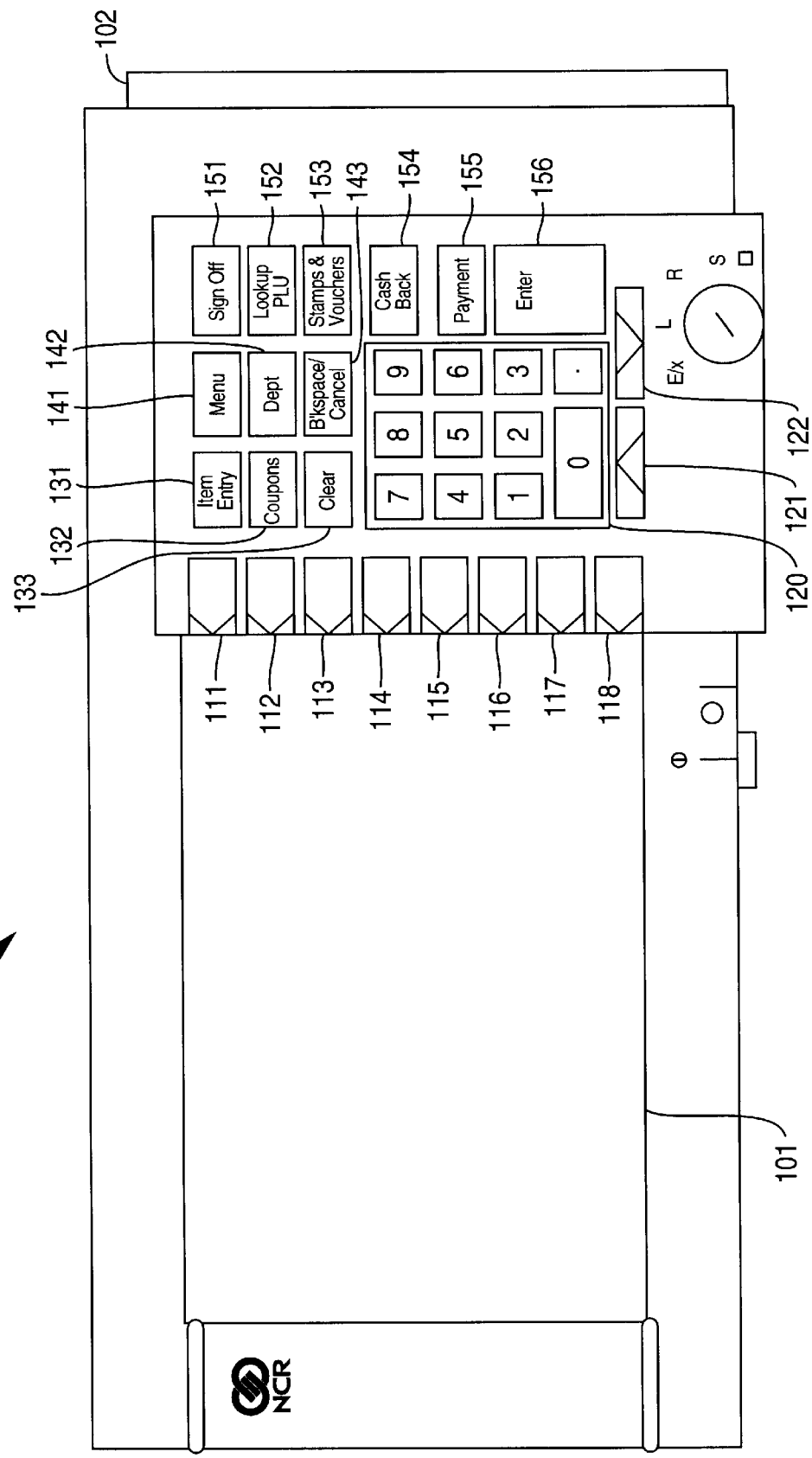
FIG. 1C illustrates a front view of a DynaKey™ for use with the present invention.

FIG. 1C illustrates a DynaKey™ 100 POS peripheral device for use in conjunction with the present invention. DynaKey™ 100 is comprised of an LCD screen 101, a magnetic stripe reader 102, eight dynamically programmable keys, or DynaKeys™, 111–118, a numeric keypad 120, an "up" cursor control key 121, a "down" cursor control key 122, and twelve additional programmable keys 131–133, 141–143, 151–156 arranged in three columns and six rows. POS terminal 28 is adapted for use in conjunction with the present invention as described further below. DynaKeys™ 111–118 may be dynamically programmed in that their programmed function can change with each different screen. The twelve additional programmable keys arranged in three columns 131–133 and six rows 141–146 are static keys. That is, the programmed function is constant regardless of the screen currently displayed, although each static key is not necessarily active for each screen.

Figure 2A:
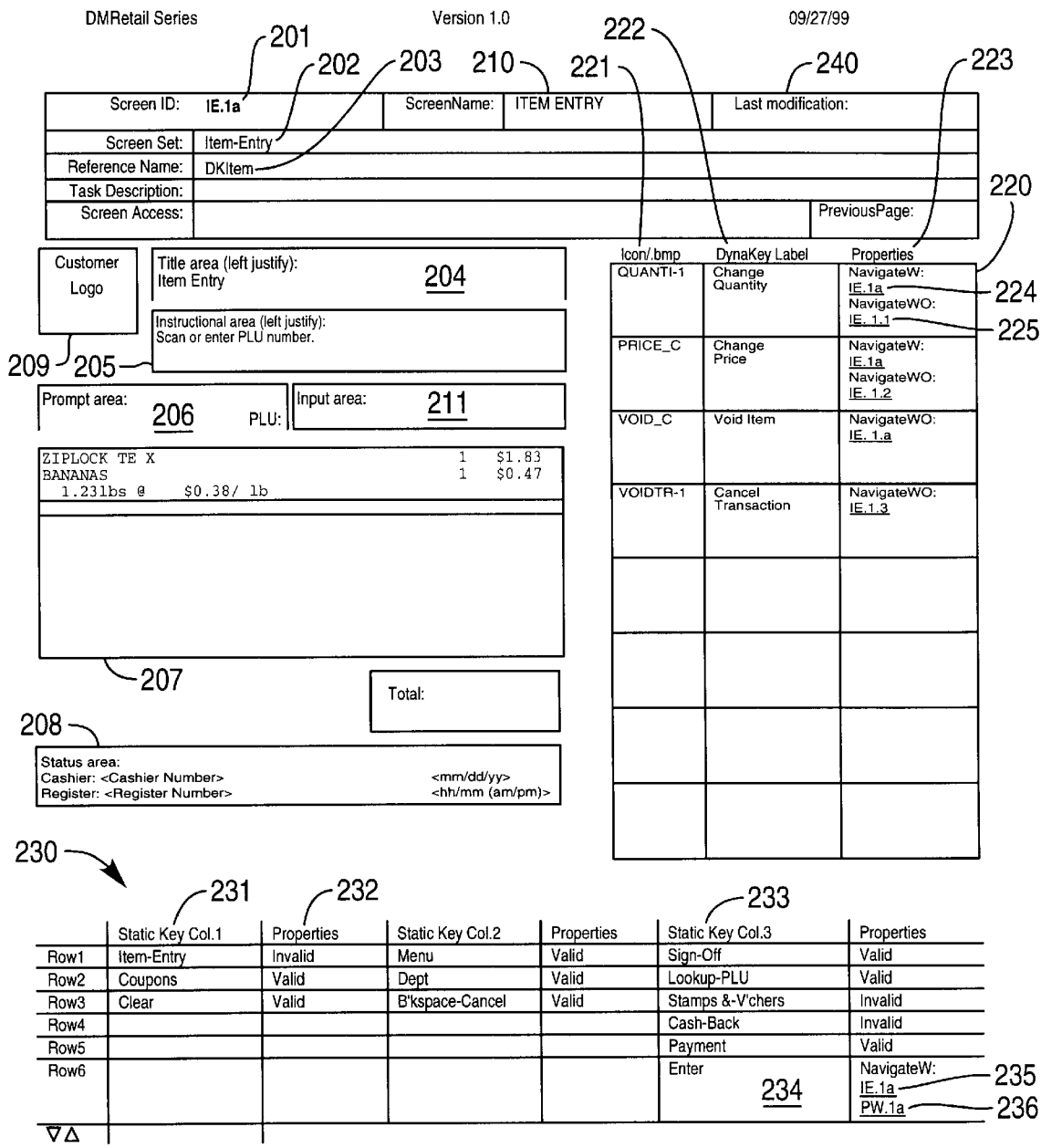

FIG. 2A illustrates a sample item entry, or sales, screen 200 created utilizing a Microsoft® Word screen design document. The "Screen ID:" field 201 in the upper left corner of the illustration is used to identify this particular screen, and may consist of any text string. As shown in FIG. 2A, the "IE" portion of the text string denotes that this particular screen is an item entry screen, and the ".1a" portion of the text string denotes that this is the first screen of the "IE" screen set. The "Screen Set:" field 202 contains the text string "Item-Entry". The label "Item-Entry" 202 also appears in the lower left corner of FIG. 2A indicating that "Item-Entry" will appear on a static key label located at row 1 and column 1 of the DynaKey™. The hyphen in the label "Item-Entry" indicates that the paper label for the associated keycap on the DynaKey™ will be printed in two lines with "Item" on the first line and "Entry" on the second line. Some "Screen Set:" names will not appear as static key keycap labels, but represent screen sets that indicate branching to one or more other screen sets. The "Reference Name:" field 203 indicates the particular type of form represented by the screen design document. Valid form types include "DKItem", "DKItem2" or "DKList". A fourth form type, "DKError", does not explicitly appear within any screen design documents.

Continuing, other fields illustrated by FIG. 2A include the "Title" field 204, the "Instruction" field 205, the "Prompt" field 206 and the "Input Area" field 211. Field 207 of FIG. 2A shows an example of a customer receipt. Field 208 shows the status line that appears on the bottom of each DynaKey™ screen. Neither field 207 nor field 208 is data-mined by the data-mining tool <D> of the present invention. These two fields are related to specific logical functions of the runtime module <R>, and may be re-used from one <R> to another. Field 209 illustrates the area for a logo icon that may be included on the screen to identify the corporate entity. Field 210 shows the screen name associated with the screen set.

The right side of FIG. 2A shows a table 220. Each row of table 220 contains information for each of the eight DynaKeys™ that may be active for any given screen. The first column 221, and labeled "Icon/.bmp", contains the name of an icon or bitmap that is to be displayed to the right of an associated active DynaKey™. The second column 222, and labeled "DynaKey™ Label", contains a one or two line label associated with an active DynaKey™. The third column 223, labeled "Properties", contains logical branching information that determines the next screen that will be displayed when the associated DynaKey™ is pressed. The first entry 224 of column 223, labeled "NavigateW:", indicates the logical branch that the application follows if data has been entered in field 211, labeled "Input Area", before the associated DynaKey™ is pressed. The second entry 225 of column 223, labeled "NavigateWO:", indicates the logical branch that the application follows if data has not been entered in field 211 before the associated DynaKey™ is pressed. There are two different types of logical branching, one is local and the other nonlocal.

A local branch is defined as branching from one screen to another screen within the same screen set. Local branching may be to a primary screen or an auxiliary screen within the same screen set. Nonlocal branching is defined as branching from one screen in a screen set to the first screen within a different screen set.

The bottom of FIG. 2A shows a table 230 that defines the static key names and properties. The static keys are those labeled 131–133, 141–143 and 151–156 as illustrated in FIG. 1C. Row 1–3 of column 231 corresponds to static keys 131–133, row 1–3 of column 232 corresponds to static keys 141–143 and row 1–6 of column 232 corresponds to static keys 151–156. For example, the first entry in column 231, row 1, corresponds to the label on static key 131. The first entry in column 232, row 1, corresponds to the property assigned to static key 131 for this screen set. When static key 131 is pressed, and the associated property of column 232 is "Valid", a screen traversal to the first screen of the new screen set is accomplished, providing certain preconditions are met. If however, the associated property of column 232 is "Invalid", the DynaKey™ device will sound a beep. The branching properties associated with the "Enter" static key 234 is similar to the active DynaKey™ branching described above in that there are two branching paths. In this case, however, the branching path selected is based upon whether a price look-up (PLU) number has been entered in field 211. If a PLU has been entered, the branch path is to the "PW.1a" screen as shown in field 236. If a PLU has not been entered, the path is to the "IE.1a" screen as shown in field 235.

FIG. 2B illustrates a sample "department" screen 250, and is very similar to screen 200 discussed above. The "Screen ID:" field 251 in the upper left corner of the illustration is used to identify this particular screen, and may consist of any text string. As shown in FIG. 2B, the "DP" portion of the text string of field 251 denotes that this particular screen is a department screen, and the ".1a" portion of the text string denotes that this is the first screen of the "DP" screen set.

Figure 3A:
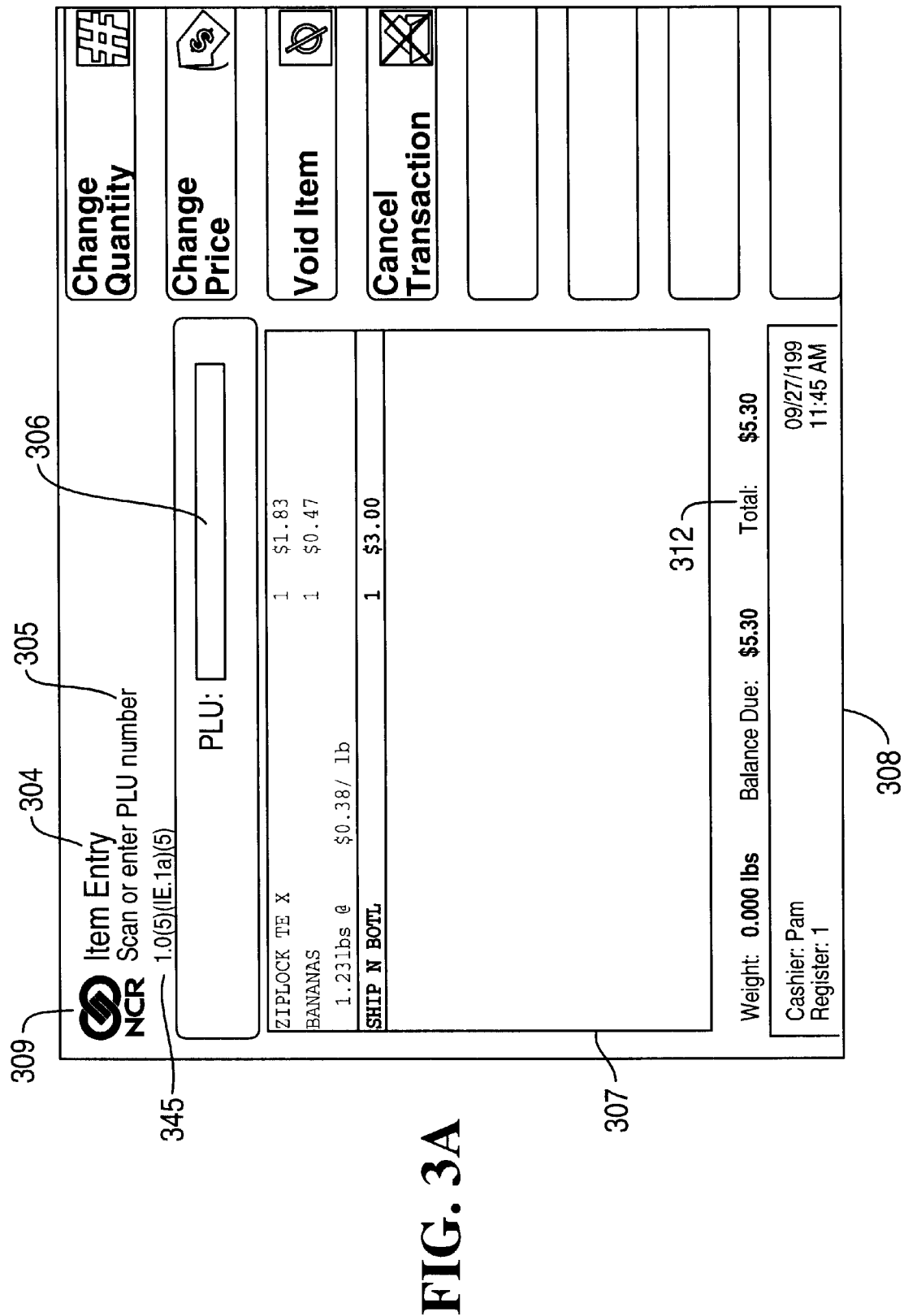
Figure 3D:
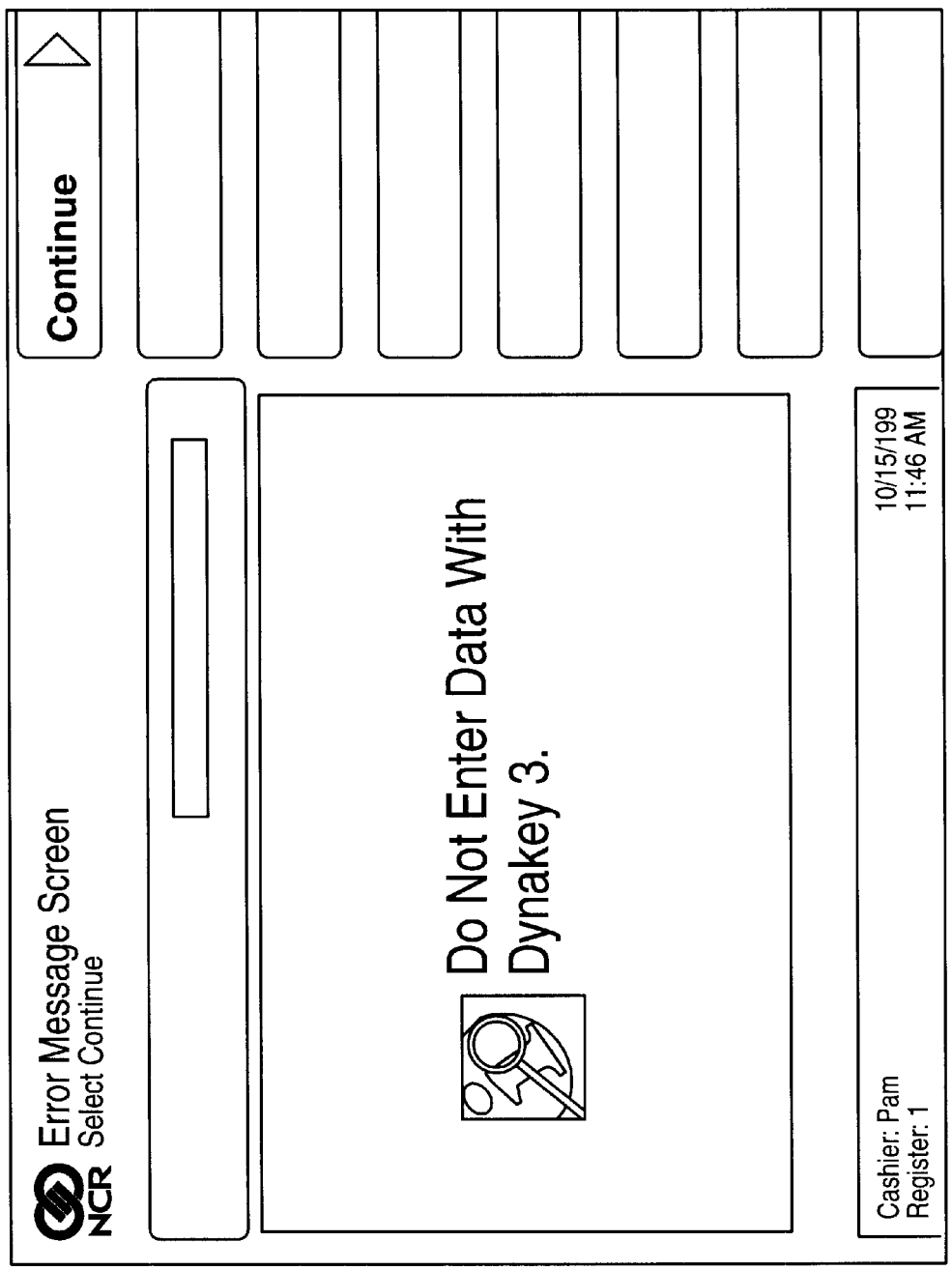
Figure 3E:
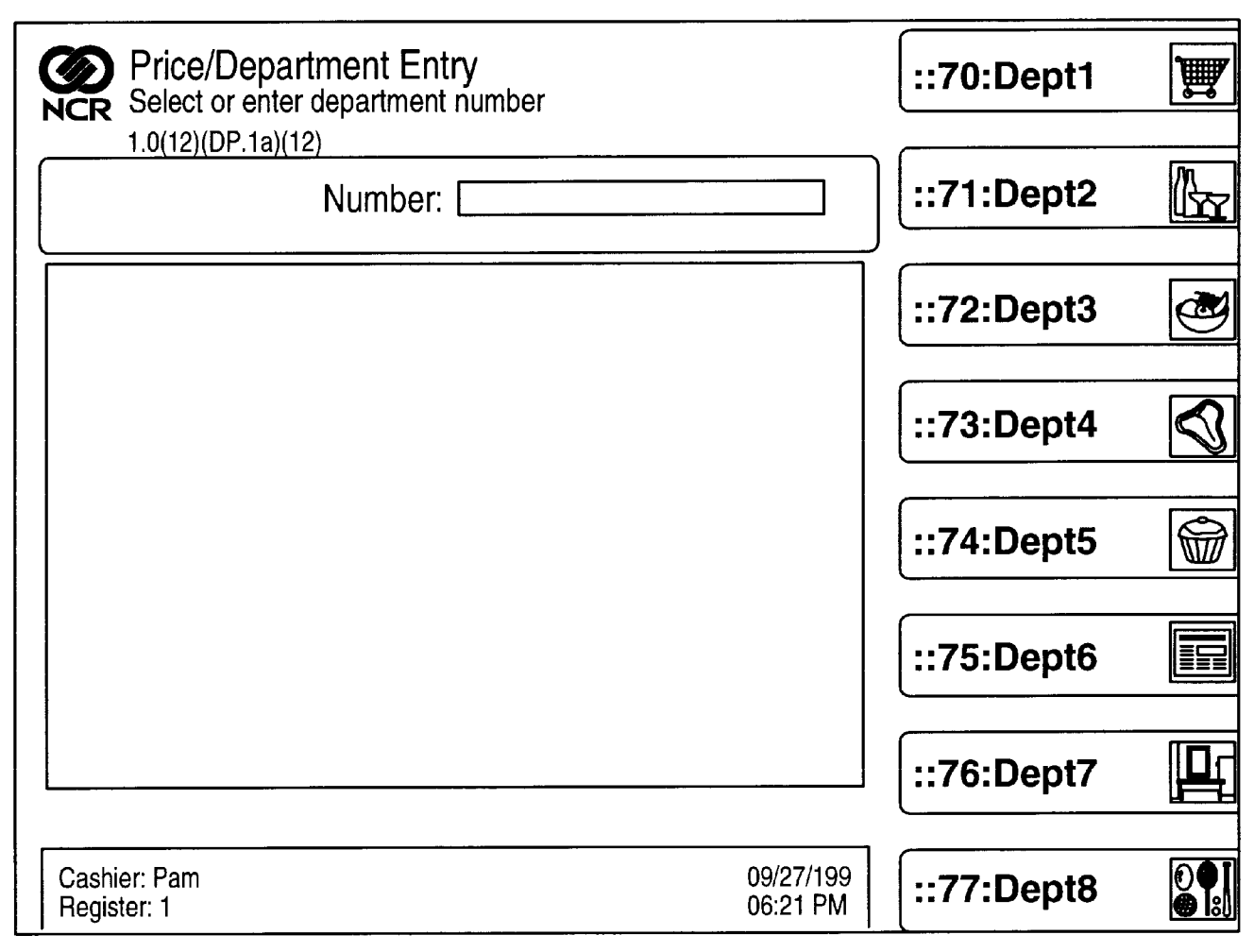

FIG. 3A illustrates an actual DynaKey™ screen based on the Microsoft® Word design document shown in FIG. 2A. The title area 304, instruction area 305, prompt area 306, customer receipt area 307, total line 312 and status area 308 are associated with various ASUI object-oriented controls with their own methods, properties, etc. The DynaKey™ labels and icons are associated with a single control, called a "Flexbar" control, which functions as a multi-button control. An optional additional instruction line 345 is displayed showing the design document's version number, the integer screen number used by <R>, the "Screen ID:" text and the source page in the design document. As illustrated in FIG. 3A, this optional instruction line 345 is shown as "1.0(5)(IE.1*a*)(5)". FIGS. 3B–E illustrate the actual DynaKey™ screens based on the Microsoft® Word design document shown in FIG. 2B. FIG. 3B shows the first screen of the screen set, before any branching has occurred, with variable text decoding for the DynaKey™ labels. FIGS. 3C and 3D illustrate the "DK List" form and "DK Error" form, respectively, associated with the screen design document of FIG. 2B. FIG. 3E illustrates the screen that is shown when the by the runtime system <R> for the initial prototype before the decoding has been performed for the DynaKey™ labels.

FIG. 4 shows the result of data-mining the screen design document illustrated in FIG. 2A.

The external file abstraction is a slotted variable ASCII file, where the slot name is text followed by a colon, or just a colon for continuation lines. The actual slot information appears to the right of the colon. The data-mining function is completed without checking for any errors that might exist in the design document itself FIG. 5A illustrates a segment of the external interface file (*.csv) created by processing a data-mined file like the one shown in FIG. 4. The heading lines 501 indicate the record types and the record fields. The record lines 502, 503, 504, 505 and 506 contain information that correspond to the various key and device names described in the header lines 501. The records 502 that begin with a "0" correspond to the 11 static keys of the DynaKey™ device and are identified by row (second comma delineated field) and column (third comma delineated field) and correspond to table 230 as shown in FIG. 2A. The record 503 that begins with a "1" corresponds to the various text fields contained in a design document, and described in the header line 501 labeled "TEXT". The records 504 that begin with a "2" correspond to the active DynaKeys™ for any given screen design document. The record 505 that begins with a "3" identifies whether any attached peripheral devices and static keys are active for any given screen design document. The names of the peripheral devices and the static keys are contained in the header line 501 labeled "ENVIRONMENT". The letter "F" or "T" indicates whether the device or key is inactive or active, respectively. The record 506 that begins with a "4" corresponds to the function of the <Enter> key. The various comma delineated fields of the 502, 504 and 506 correspond to the screen branching (navigation) information, entry level logic (ELL) functions numeric designation, and data length ranges associated with the various keys as described in the screen design document illustrated in FIG. 2A. The <B> tool is utilized by a software engineer, or other user, to make changes to the FIG. 5A data contents, and an example of the output of this tool is illustrated in FIG. 5B. In this instance, the encoded, prototype ELL names are modified to be encoded, production ELL function names, some data ranges have been modified, and peripheral information has been added for physical devices that can be used in conjunction with the FIG. 2A screen.

FIG. 5C illustrates another portion of the external interface file, and stores information for each of the screen sets, including other global keys such as the <Clear> key. As disclosed in U.S. Pat. No. 5,920,312, the "*.key" file was manually typed before the <B> tool was used to create new screens. In the present invention, the data-mining tool, or <D>, is utilized to create and modify the "*.key" file automatically.

FIG. 6A illustrates the result of utilizing <B> to print the initial interface of FIG. 2A in a plain text format. Default ELL function assignments are listed by name, text branching is replaced by integer screen branching, screen generation is done using top-down screen processing, and data ranges are from 1 to 10 digits. The software engineer can use this document to write in the new ELL function names and make other changes before <B> is used to make the changes. The result of this process is shown in FIG. 6B.

The back-side of each page associated with FIGS. 6A and 6B is not shown. The back-side of each page shows the global static key names, with an X to the left of each one that is applicable to the screen. The back-side pages also show the peripheral names with an X to the left of each that can be used when the screen is displayed. Once <B> is used to make peripheral assignments, then the corresponding ELL and branching assignments can also be finalized in <B>. It is therefore desirable to provide a method for handling a significant amount of the DynaKey™ GUI automation by having <D> work in conjunction with the <B>, <R>, and <T> components described in U.S. Pat. No. 5,920,312. In this process, it is inevitable that some changes to the three existing components <B>, <R>, and <T> will be required, but the effort is worthwhile in that the final four-tuple family, <D, B, R, T> can be used as a base for accurately implementing a series of iterative DynaKey™ designs for a wide range of retail checkout systems.

Referring now to FIG. 7A, a sample VBA function that is used to extract title information is illustrated. This VBA code is very intricate and it is best to begin the coding process by using the VBA macro-recorder. The VBA development programming environment allows a programmer to turn on the recorder once the Word document is opened. Once the document is open, the mouse is used to perform a search of the Word file to find the string "Title area (left justify):". Next, the "Home" keyboard key is pressed to deselect the selected text. Movement to the next line is then done by pressing the downward cursor key. And finally, the title contents are selected by holding the <Shift> key down while pressing the <End> key. The macro-recorder is then turned off, and all the manual work just completed, excluding mouse clicks, is saved to a macro-recorder file. This provides much of the necessary VBA code shown in FIG. 7A, beginning with the word "Selection" and ending with the phrase "wdExtend". The only required modification is that the ".Wrap" parameter text value must be changed from "wdFindContinue" to "wdFindStop". This is necessary to prevent a wrap-around search after the last page of the design document is processed. The actual extraction function is completed by adding a few more lines of VBA code to insure the selected text is placed in a character string variable before this text string is deselected. After the function is constructed, it can be added into the final data-mining program as one of the functions the main program will call.

Figure 7B:
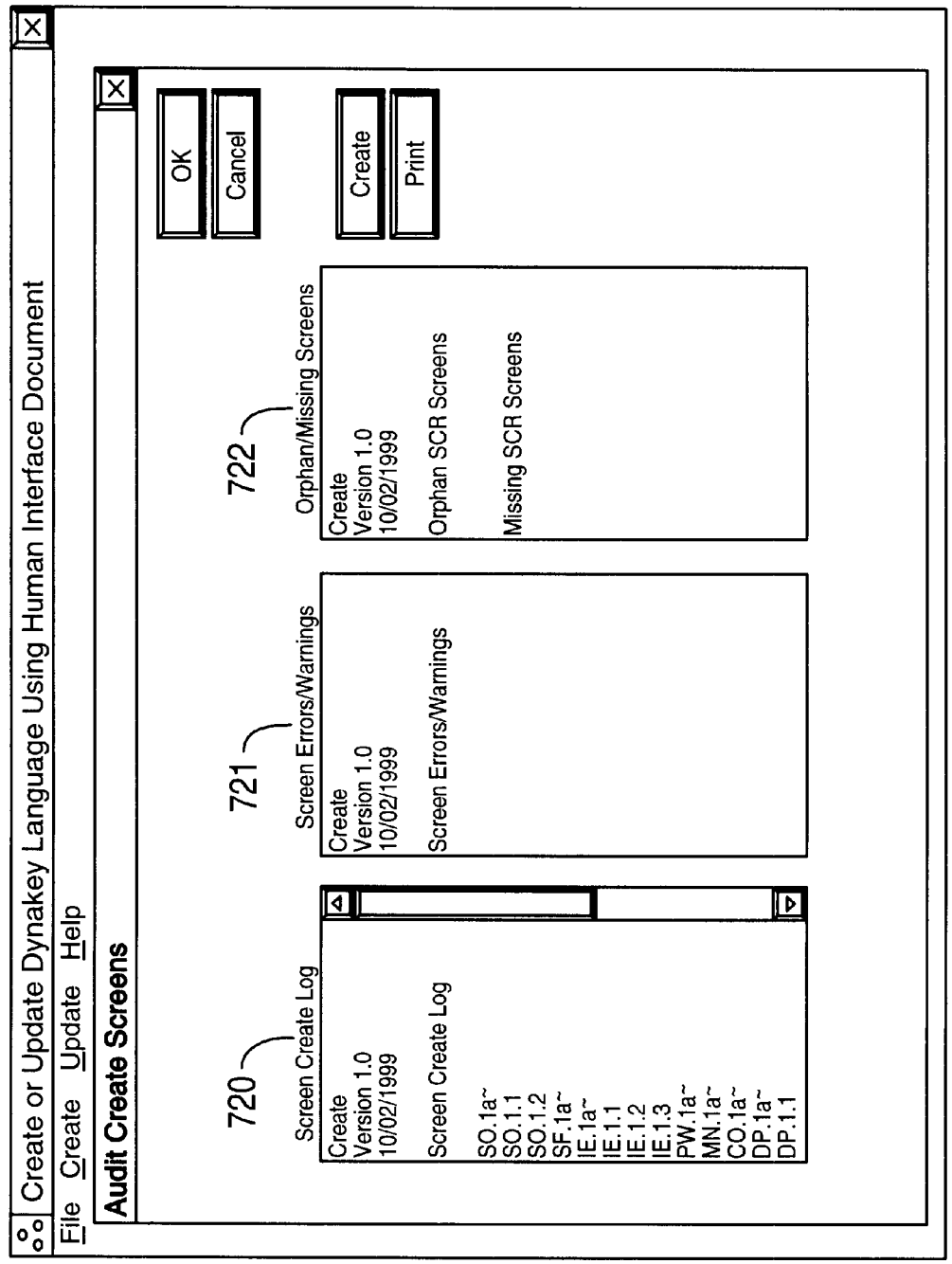
FIGS. 7B and 7C illustrate the "Create" dialog resulting from the processing of the data-mined file associated with the screen design document of FIG. 2A.
Figure 7C:
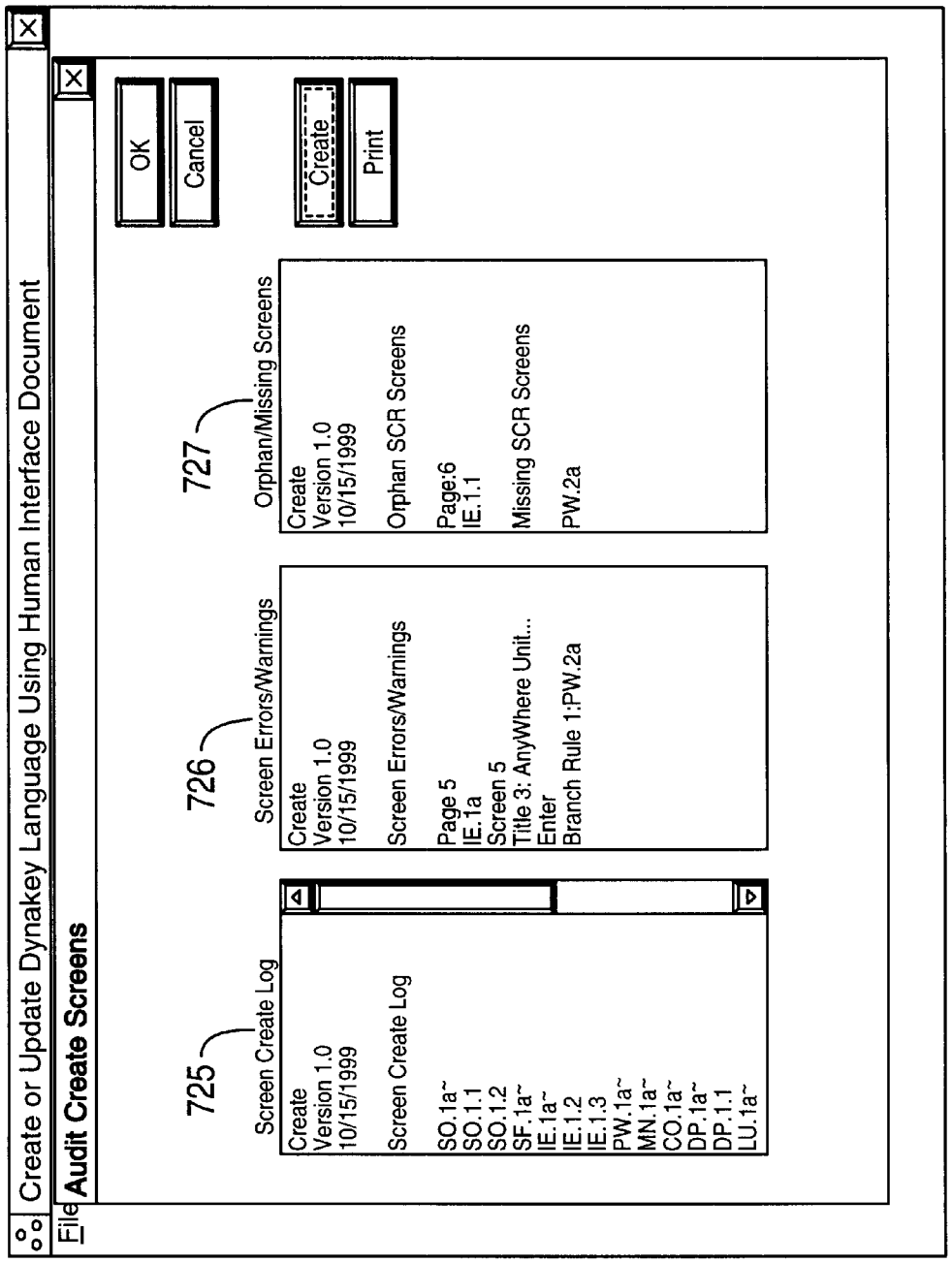

FIG. 7B illustrates sample results of using a data-mined file in the "create" mode with no errors. The "Screen Create Log" column 720 lists the screens in the order that they were created. The "Screen Errors/Warnings" column 721 lists any errors that were detected when the <D> tool was executed on the data-mined file. The "Orphan/Missing Screens" column 722 lists the screens that are orphaned or missing. Orphaned screens are those that are not referenced by branching from any other screens, and missing screens are those that are referenced by branching from other screens, but that do not exist. The significance of the screen illustrated is discussed further below. FIG. 7C is similar to FIG. 7B, but illustrates the case where errors are detected when the <D> tool was executed on the data-mined file. The "Screen Create Log"

column 725 lists the screens created in order, the "Screen Errors/Warnings" column 726 lists the errors that were detected when the <D> tool was executed on the data-mined file and the "Orphan/Missing Screens" column 727 lists the screens that were detected to be orphaned or missing.

Figure 7D:
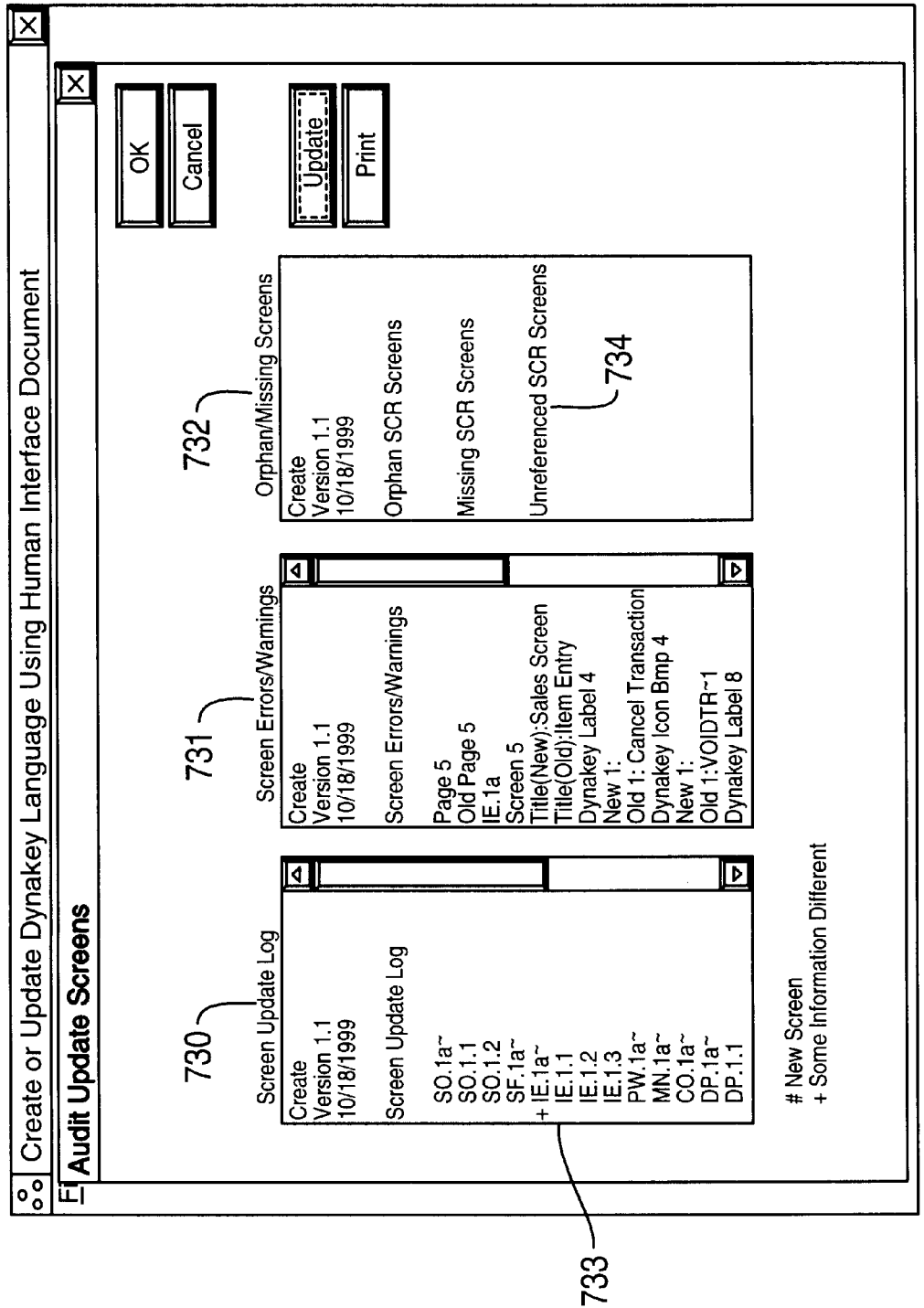
FIG. 7D illustrates the "Update" dialog resulting from the processing of the data-mined file associated with the screen design document of FIG. 2A.

FIG. 7D is also similar to FIG. 7B, but illustrates sample results of using a data-mined file in "update" mode instead of "create" mode. In this example, the "Screen Create Log" column 730 illustrates a "+" symbol 733 indicating that the "IE.1a" has been updated in the illustrated iteration of "update" mode. In addition, the absence of the "#" symbol next to any of the listed screen names indicates that a previously existing screen has not been updated. The "Screen Errors/Warnings" column 731 is similar to that of column 721 in FIG. 7B, except that the "Old" and "New" information is added. The "Orphan/Missing Screens" column 732 lists an additional sub-heading labeled "Unreferenced SCR Screens" 734. This sub-heading lists any screens in the existing interface that are no longer referenced by screen branching from other screens.

Figure 8A:
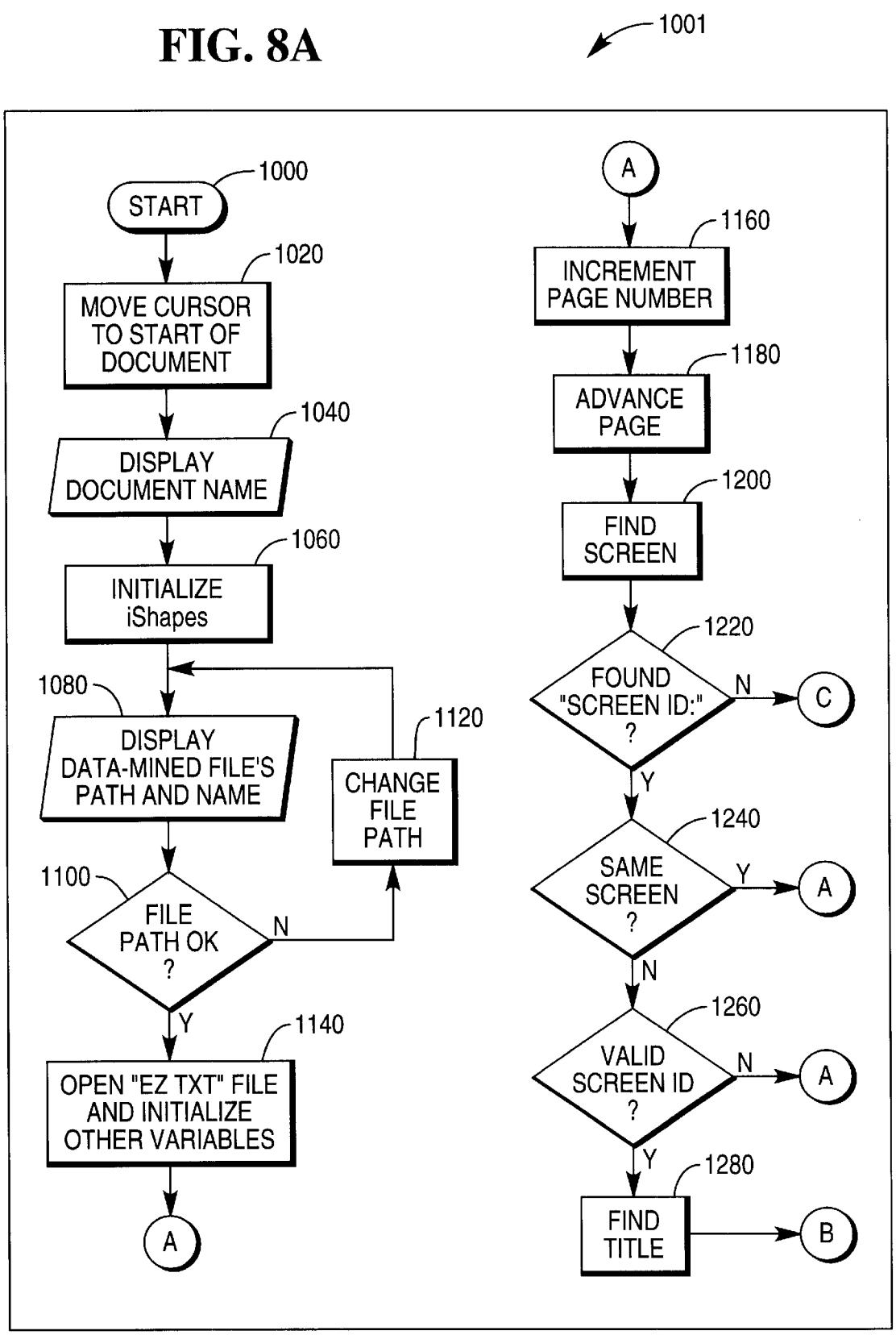
FIGS. 8A through 8C illustrate a process for data-mining a screen design document.
Figure 8B:
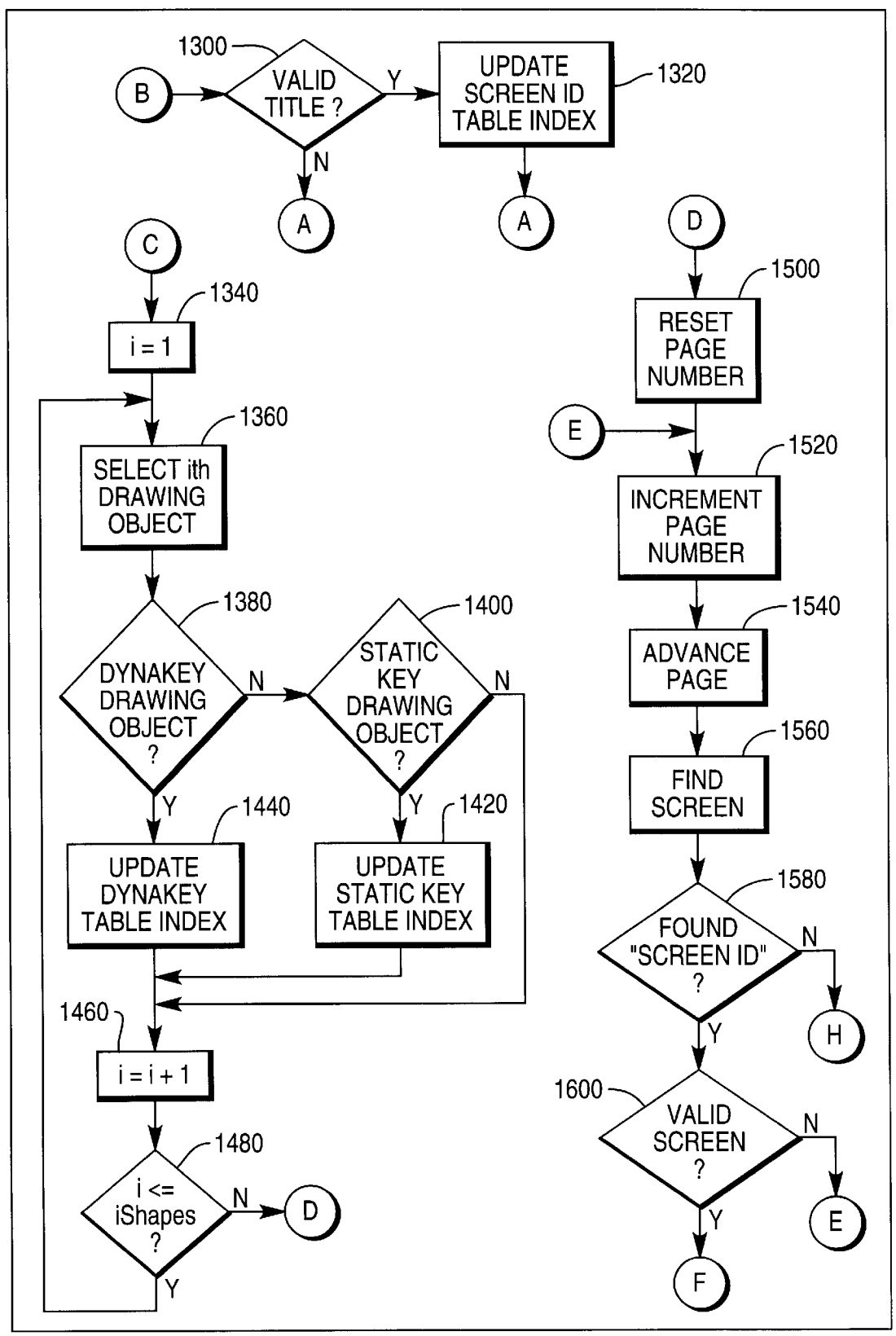
Figure 8C:
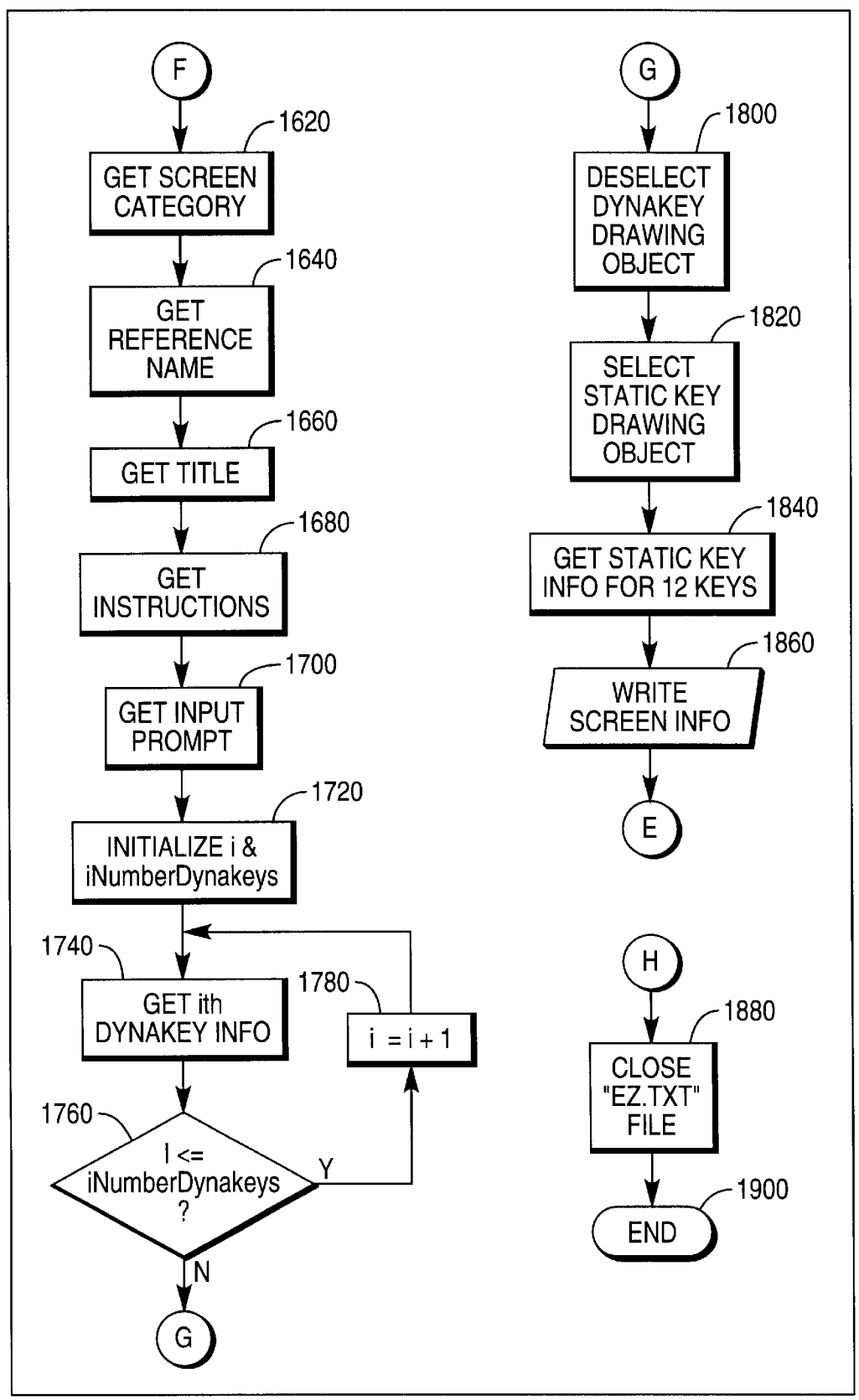

FIGS. 8A through 8C illustrate a process 1001 for data-mining a screen design document created with Microsoft® Word. The data-mining tool <D> is used to extract DynaKey™ screen information from the design document using VBA. The data-mining tool <D> performs three tasks that are all integrated within a Microsoft® Visual C++™ dialog-based program. Since the data-mining is done in VBA, a system call must be made to Word to allow the interface design document to be opened and displayed. Then, while still invoking Word, a VBA macro is executed to allow the pages of the document to be data-mined. Before explaining the process, note that the two sample design document pages shown in FIG. 2A and FIG. 2B do not show that duplicate pages often exist with respect to the same "Screen ID:" contents. These extra documentation pages utilize the same identification table 240 information as illustrated in FIGS. 2A and 2B, but the remainder of the page will have a different format to accommodate comments about how the screen is used. In addition to these duplicate pages, there may be blank pages at the end of the design document as well. These blank pages are utilized when a programmer needs to add new pages to the design document. This approach allows default information such as static key names and their associated default values to be easily and accurately incorporated into the new pages.

It might appear that the rest of the extraction work for the remaining fields within the design document as illustrated in FIGS. 2A and 2B can be accomplished in a similar fashion as described above, but this is not the possible. For example, when the macro-recorder is used to locate a table header, such as "Icon/.bmp", the manual search causes the associated table to be selected and navigation within the table can then proceed. But when the corresponding VBA macro for this process is executed, the cursor does not move from the first design document page where the manual search was started. This problem is made even more complex once the information from a table has been extracted since the table must be deselected before searching can be accomplished outside the table. Deselecting a table in Word is ordinarily accomplished by clicking the mouse outside the table. However, since mouse clicks are not recorded, a different method must be utilized in an automated process.

In order to solve these two problems, the automated process must know that the two tables on each page of the design document are Word "drawing objects", each anchored to their respective screens. Second, each "drawing object" is associated with a unique integer number, which can be used by a VBA command to select the object. In addition, there is another VBA command that gives the total number of these objects in the document. This value can be used to loop through all the integer numbers searching for all of these "drawing objects". Since the "drawing object" tables cannot be assumed to be in any particular order within the document, two indexes need to be created before the data-mining is started. The first index keeps a list of page numbers and the number of the DynaKey™ "drawing object" on that page. If there are no "drawing objects" on that page, then the number is set to −1. This same step is also performed for the static key index. To accomplish this correlation, the document is first processed to construct a table with each page and its "Screen ID:" value. Then another pass is made to locate each "drawing object" in the document by using the correct integer number. After each valid selection, a "GoTo" branch is made to the previous page to deselect the "drawing object", a "GoTo" branch is then made forward one screen, and finally a search is made for the "Screen ID:" text. This enables the "drawing object" indexes to be created. A third and final pass is then made to complete the data-mining.

The other difficulty with using VBA is that it can "crash", resulting in the program returning control to the VBA editor. For example, when VBA data-mining commences, and the output file path is displayed, the user may want to override the default path. In this instance, the VBA will terminate if the new path is not a valid destination. To overcome this problem, VBA allows a declaration to be made prior to the first executable statement in the main program or function. This declaration identifies the name of an error label to branch to when the program is about to terminate. This error label is placed at the end of the main program or function. When the execution error occurs, program control branches to the source line containing the error label, and the program execution resumes. In this case, messages are displayed informing the user of the error before a branch is made to a second label. This second label will be on the line preceding the instruction that displays the path of the destination output file. This enables the user to continually modify the path until a correct one is entered.

Referring again to FIGS. 8A–8C, a method for data-mining a Word screen design document is illustrated. The process starts at step 1000 and proceeds to step 1020 where the word processor cursor is positioned at the beginning of the Word document utilizing the VBA command "Selection.HomeKey Unit:=wdStory". This step enables a subsequent search to find the version number that is located on the first page of the document, before the table of contents. At step 1040, the VBA command "MsgBox Documents(1).FullName" is executed, resulting in the display of the name of the Word document being data-mined. At step 1060, the variable "iShapes" is initialized to the maximum integer value associated with all of the "drawing objects" in the Word document. The VBA command utilized to retrieve this value is "Active Document Shapes Count", but since this value is zero-based, the number actually stored must be the next higher integer in order for the maximum number to be one-based. At step 1080, the path and file name for the output file is determined. The VBA command "InputBox$" is executed resulting in the display of a dialog box with a default path and file name. This value may be accepted by clicking on the "OK" button, or another path and file name may be entered. At step 1100, it is determined if the path and file name are valid. If the path and file name are not valid, the process proceeds to step 1120, and the user is prompted for a valid path and file name. The process then returns to step 1080. If the path and file name are valid, the process proceeds to step 1140. At step 1140, the "ez.txt" data-mining output file is opened, and other variables are initialized. These variables include the character variable "chVersion$", which is initialized as a text string. Also, the corresponding slotted variable is immediately written to the "ez.txt" file since it appears only at the beginning of the file. The version number is initialized by reading the contents of the "Version" field. In addition, the two "drawing object" indexes are initialized to the value −1, and an integer page number is set to zero.

Proceeding to step 1160, the integer page number is incremented by one, and this value is stored as a character string variable. This step is accomplished by executing the VBA command "chPageNum$=LTrim$(Str(iPageNum))", where the integer page variable is "iPageNum". At step 1180, the process proceeds to data-mine the design document page corresponding to the value of "chPageNum". At step 1200, the process reads the value of the "Screen ID:" field. At step 1220, the process evaluates the contents of the "Screen ID:" field. If the field is blank, the end of the design document has been reached. At this point, the indexing is completed, and the process proceeds to step 1340 for further processing which is discussed in further detail below. If the field is not blank, the process proceeds to step 1240, where the process determines if the value of the "Screen ID:" is the same as the previous screen. If so, the current page is a documentation page, and the page index is not updated. The process then returns to step 1160, where the page number is incremented again. If the value of the "Screen ID:" field is not the same as the previous screen, the process proceeds to step 1260. At step 1260, the process determines if the value of the "Screen ID:" field is valid. If the value is not valid, the "Screen ID:" field is blank, the screen will not be processed further, and the process returns to step 1160.

If the "Screen ID:" field is valid, the process proceeds to step 1280.

At step 1280, the title of the page is extracted, and the process proceeds to step 1300. At step 1300, the process determines if the title field is valid. If the title field is not valid, the screen will not be processed further, and the process returns to step 1160. If the title is valid, the process proceeds to step 1320. At step 1320, the "Screen ID:" index is updated, and the process returns to step 1160. The process steps 1160–1320 are repeated until each screen page of the Word design document has been evaluated. In summary, the function of process steps 1160–1320 is to build an index of each screen page within the design document. Each screen that contains actual design data is noted, and the screens that are either invalid or contain documentation only are excluded from further data-mining.

Referring back to the description of step 1220 above, after each screen page has been indexed, the process branches to step 1340. At step 1340, the "drawing object" variable "i" is set to 1. The two "drawing object" indexes corresponding to the DynaKey™ table and the static key table are created by executing process steps 1360–1480. At step 1360, the VBA command "ActiveDocument.Shapes(chRectangle$).Select" is executed, resulting in the selection of the $i^{th}$ "drawing object". Additional VBA commands are utilized to identify the table as an "Icon/.bmp" table or a "Static Key Col. 1" table, as well as to determine the page number associated with the particular screen. At step 1380, the process determines if the selected text is a "drawing object" for a DynaKey™ table. If not, the process proceeds to step 1400, and the process determines if the selected text is a "drawing object" for a static key table. If the selected text is neither a DynaKey™ "drawing object" nor a static key "drawing object", the process proceeds to step 1460. Referring back to step 1380, if the selected text is a DynaKey™ "drawing object", the process proceeds to step 1440. At step 1440, the DynaKey™ "drawing object" index is updated and the process proceeds to step 1460. Referring back to step 1400, if the selected text is a static key "drawing object", the process proceeds to step 1420. At step 1420, the static key "drawing object" index is updated and the process proceeds to step 1460. At step 1460, the "drawing object" variable I is incremented by 1, and the process proceeds to step 1480. At step 1480, the process determines if there are any more "drawing objects" to be selected. If so, the process returns to step 1360, and the process continues to index the "drawing objects" in either the DynaKey™ index or the static key index. If there are no more "drawing objects" to be selected, the process proceeds to step 1500.

At step 1500, the page number is reset to 0. At step 1520, the integer page number is incremented by one, and this value is stored as a character string variable. This step is accomplished by executing the VBA command "chPageNum$=LTrim$(Str(iPageNum))", where the integer page variable is "iPageNum". At step 1540, the process proceeds to data-mine the design document page corresponding to the value of "chPageNum". At step 1560, the process reads the value of the "Screen ID:" field. At step 1580, the process evaluates the contents of the "Screen ID:" field. If the field is blank, the end of the design document has been reached. At this point, the screen data-mining is completed, and the process proceeds to step 1880 for further processing which is discussed in further detail below. If the field is not blank, the process proceeds to step 1600, where the process determines if the value of the "Screen ID:" field is valid. If the value is not valid, the "Screen ID:" field is blank, the screen will not be processed further, and the process returns to step 1520. If the "Screen ID:" field is valid, the process proceeds to step 1620, and the screen is data-mined as discussed further below. In summary, the function of process steps 1520–1600 is to skip the data-mining process for a screen unless that screen contains actual screen design data.

Process steps 1620, 1640, 1660, 1680 and 1700 data-mine each screen utilizing five search strings. These search strings are the "Screen Set:", the "Reference Name:", the "Title area (left justify):", the "Instructional area (left justify):" and the "Prompt area:" respectively. These five search strings correspond to fields 202, 203, 204, 205 and 206 as illustrated in FIG. 2A. After the five search strings have been completed, and the pertinent information has been extracted and stored, the process proceeds to extract and store the "drawing object" information associated with the DynaKey™ table and the static key table. At step 1720, the variable "i" is set to 1 and the variable "iNumberDynakeys" is initialized. The process steps 1740–1780 are used to determine the number of DynaKeys™, and the content for each DynaKey™, for each screen. The VBA commands utilized to find the number of DynaKeys™ on the design page rely on several factors. First, as shown in FIG. 2A, each DynaKey™ table has three columns. Second, there are two keyboard commands that can be used to assist the VBA DynaKey™ table navigation. These keyboard commands are these "ALT+PAGE DOWN" which is used to move the cursor to the last cell in a given column, and "SHIFT+TAB" which is used to move the cursor to the previous cell in the column. In short, after the DynaKey™ index "drawing object" number is used to select the current screen's DynaKey™ table, the cursor can be moved to the last cell in the first column, and then a loop can be executed that repeatedly moves the cursor backward one cell until the selected cell contents are "Icon/.bmp", as shown in FIG. 2A as column label 221. Then, a counter variable counts the number of cells traversed. Upon loop termination, the counter variable is divided by 3 using modular arithmetic, and the result is represented by the variable "iNumberDynakeys". The final initialization task associated with block 1720 is to move the cursor to the third column 223, as shown in FIG. 2A, of the current row. The required VBA commands are determined by using the macro-recorder to first deselect the "Icon/.bmp" text, and then moving the cursor two cells to the right by pressing the "Tab" key twice. Lastly, the selected item in the last column is deselected. After the initializations performed at step 1720, the process proceeds to step 1740. The process steps 1740–1780 are repeated to data-mine the DynaKey™ table information one row at a time, until the loop variable "i" exceeds the value stored in the variable "iNumberDynakeys".

Referring back to process step 1740, the first time step 1740 is executed, the current cursor position points to the property associated with the first static key, as shown by column 223 of FIG. 2A. Therefore, the cursor must be moved one cell to the right in order to place the cursor in the first column of the next row. Now referring again to FIG. 2A, each row in the table contains 3 fields, the name of the icon or bitmap in column 221, the DynaKey™ label text in column 222 and the DynaKey™ branching information in column 223. These 3 fields are treated as text fields without regard to the number of lines that comprise each field. Each text field may have embedded line termination characters, and the number of characters of each text field is determined by utilizing the VBA "Len" command. The number of characters in each text string is retained for subsequent use, as discussed further below. The text field storage areas consist of three character string arrays and three integer arrays. At step 1760, the process determines if the variable "i" is less than the variable "iNumberDynakeys". If so, the process proceeds to step 1780 where the variable "i" is incremented by 1. The process then proceeds back to step 1740, and the next DynaKey™ table row is data-mined. If the variable "i" equals the variable "iNumberDynakeys", the DynaKey™ table data-mining is complete, and the process proceeds to step 1800.

The static key table data-mining begins at step 1800 by deselecting the DynaKey™ "drawing object". At step 1820, the static key "drawing object" is selected. The screen is searched for the string "Static Key Col.1", as shown in field 231 of FIG. 2A, and the cursor is positioned at the first entry of the static key table. At step 1840, the label and properties of each of the 12 static keys is determined. Since any given page may have less than 12 active static keys, the VBA commands must properly traverse the table of static key values, such as table 230 as illustrated in FIG. 2A. For example, the last entry in table 230 is for the <Enter> key and its associated branching information, and the remaining 11 entries are for the other static keys. A central question arises as to how to easily traverse the table when the number of cells the cursor needs to move after each static key extraction is a variable number rather than a constant number. The solution is to make the VBA commands more compact by introducing a table where the respective elements contain the number of tabs needed to re-position the cursor. Assume for example that the cursor is positioned at the "Static Key Col.1" heading 231 as shown in FIG. 2*a*. In this example, the cursor would be moved 7 tabs to the right to reposition the cursor to select the "Item-Entry" static key label. After the static key label "Item-Entry" is saved in a character string array, the cursor should then be moved one position to the right to select the associated property. This property value is then also stored in a character string array. In this manner, the static key data-mining process can be repeated 12 times until each of the static key labels and properties are determined and stored, and the process proceeds to step 1860.

At step 1860, the stored screen information for the current screen is written to the "ez.txt" file. The VBA commands to write the "Screen ID:" slot information to the "ez.txt" file are <u>chOutput$="Screen ID:"+chScreen$</u> and <u>"Write #1, chOutput$"</u>. Referring back to FIG. 2A by example, the output file information is shown in FIG. 4. Likewise, similar VBA commands are used for writing the next five slot names, and their corresponding text, to the "ez.txt" file. After writing the screen text information to the output file, the process writes the DynaKey™ screen information to the output file. For the DynaKey™ information, the DynaKey™ label is written first, the "Icon/.bmp" information is written next, and the screen branching information is written last. This is also illustrated in FIG. 4. There are three reasons for switching the order of the information. First, for any given screen, a DynaKey™ is assumed to be valid only if it's associated label is non-blank. If the label is blank, then the other two fields within that row will be ignored regardless of the contents. Second, each DynaKey™ field is extracted as a single text string. Therefore, each stored DynaKey™ label and it's associated navigation fields must be parsed to enable multi-lines of output to be generated for each DynaKey™ as shown in FIG. 4. Third, a DynaKey™ label may be erroneously preceded by blank lines, and the blank lines must be discarded during the parsing of the string. The VBA "Chr" command is utilized to parse the DynaKey™ label text string. The "Icon/.bmp" output shown in FIG. 4 is generated in a similar manner by parsing the corresponding array elements for each non-blank DynaKey™ label. The DynaKey™ navigation information is parsed utilizing a similar VBA method.

Finally, the static key information is written to the output file. First, the static keys, excluding the <Enter> key, are utilized to navigate to a new screen set, or to do some specific task within the current screen. Therefore, a loop will be executed 11 times in order to write this information to the output file. Each static key label is written first, followed by its corresponding property as illustrated in FIG. 4. After the information is written for the 11 keys, the navigational slot information for the <Enter> key is written to the output file. The VBA commands utilized to accomplish this is similar to the commands utilized to write the active DynaKey™ navigational information. The difference is that a null branch can be a valid specification if the <Enter> key is not used for the given screen. After writing the DynaKey™ and static key screen information to the output file, the process returns to step 1520, and the next screen is data-mined.

Referring back to step 1580, once the end of the design document has been reached, there will be no additional "Screen ID:"'s, and the process proceeds to step 1880. At step 1880, the "ez.txt" output file is closed, the process proceeds to step 1900, and the process ends.

Note that some of the source material used in conjunction with the data-mining techniques described above are contained in the following references: *Microsoft® User's Guide (Microsoft® Word—The World's Most Popular Word Processor—Version 6.0)* written by Microsoft® in 1993, *Microsoft® Word Developer's Kit* written by C. Doyle and B. Matteson in 1995, and *Word 97 Macro & VBA Handbook* written by G. Hart-Davis in 1997.

Figure 9A:
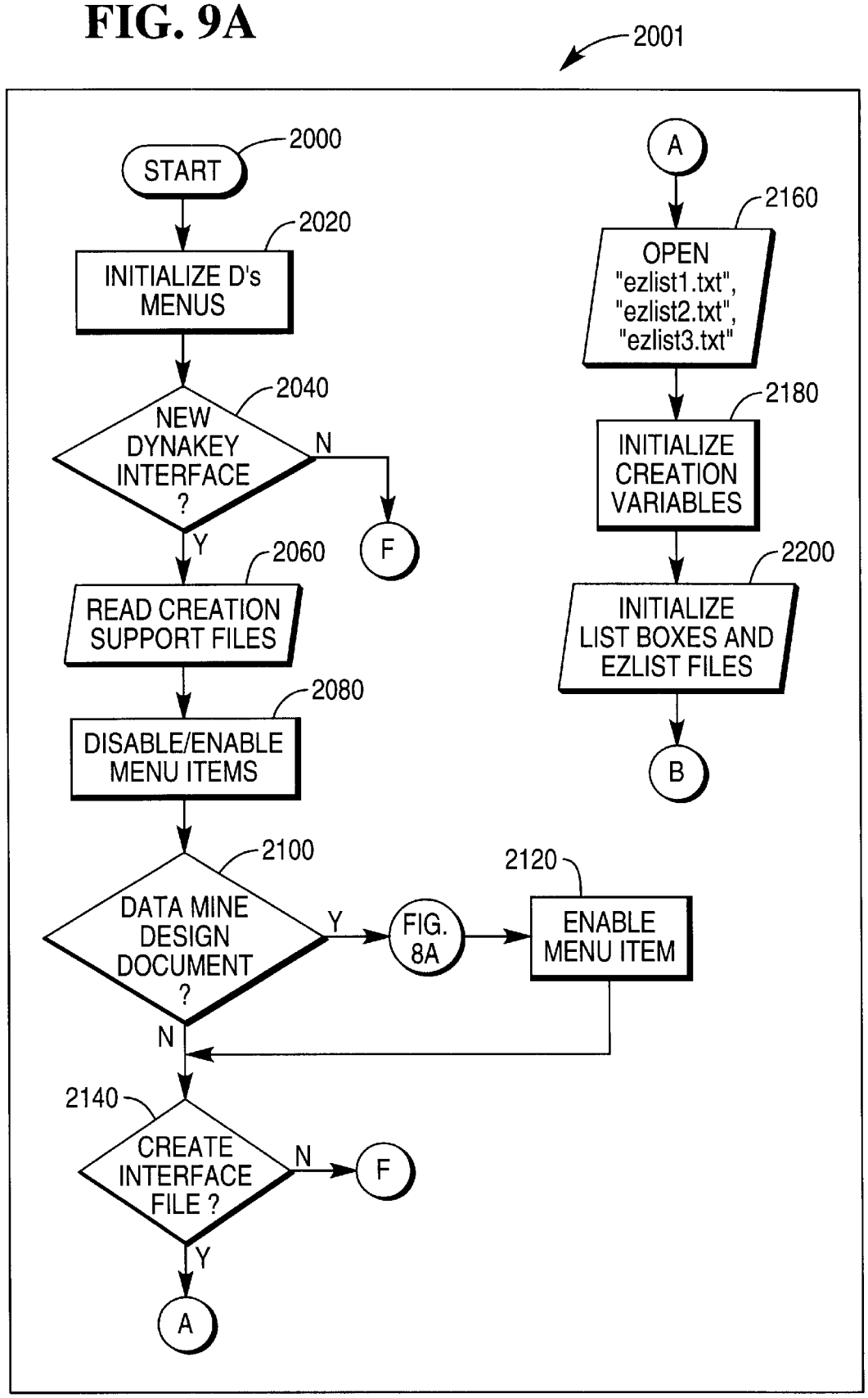
FIGS. 9A through 9C illustrate a process for creating a DynaKey™ external interface file utilizing a data-mined file associated with a screen design document.
Figure 9B:
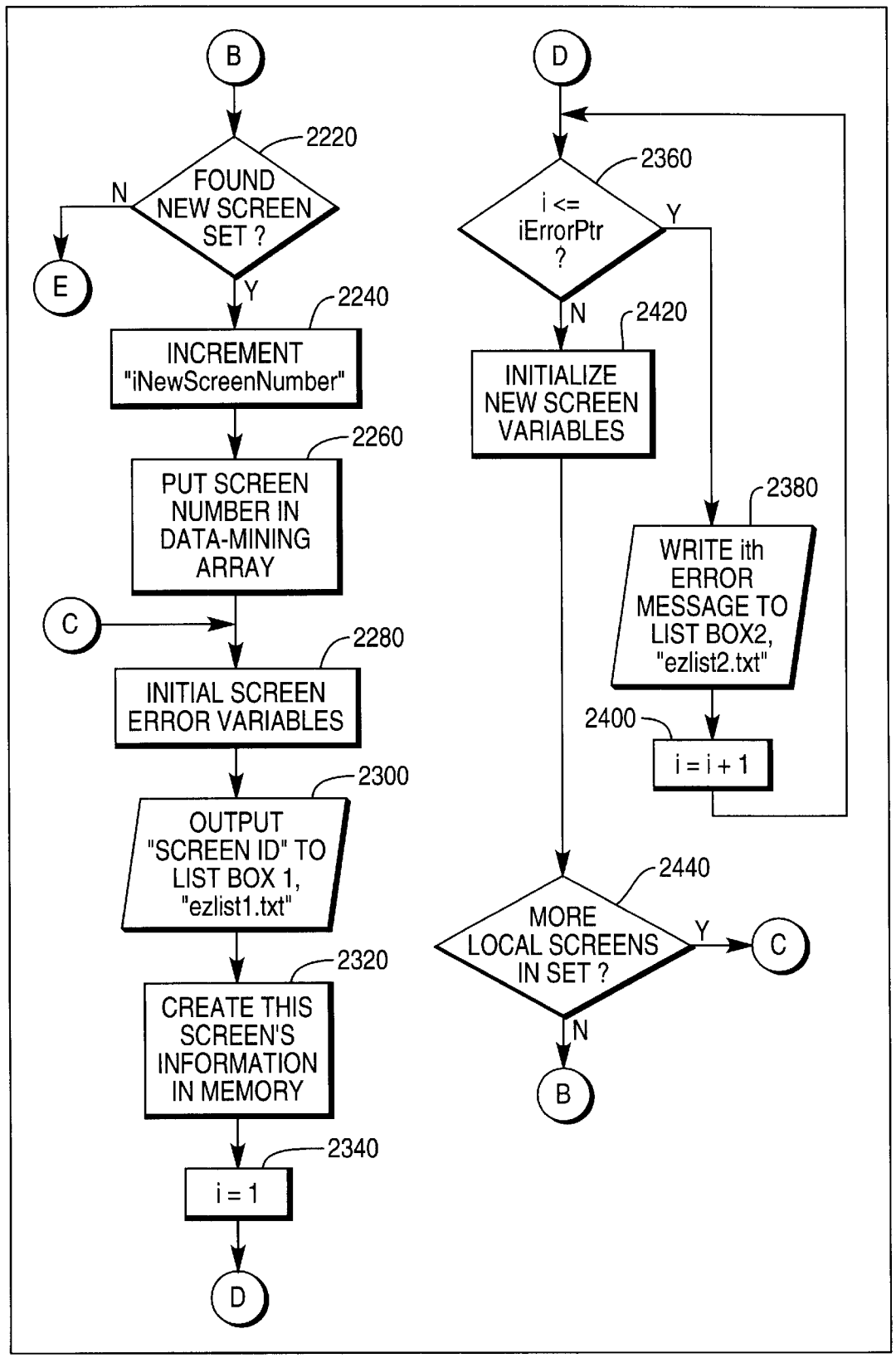
Figure 9C:
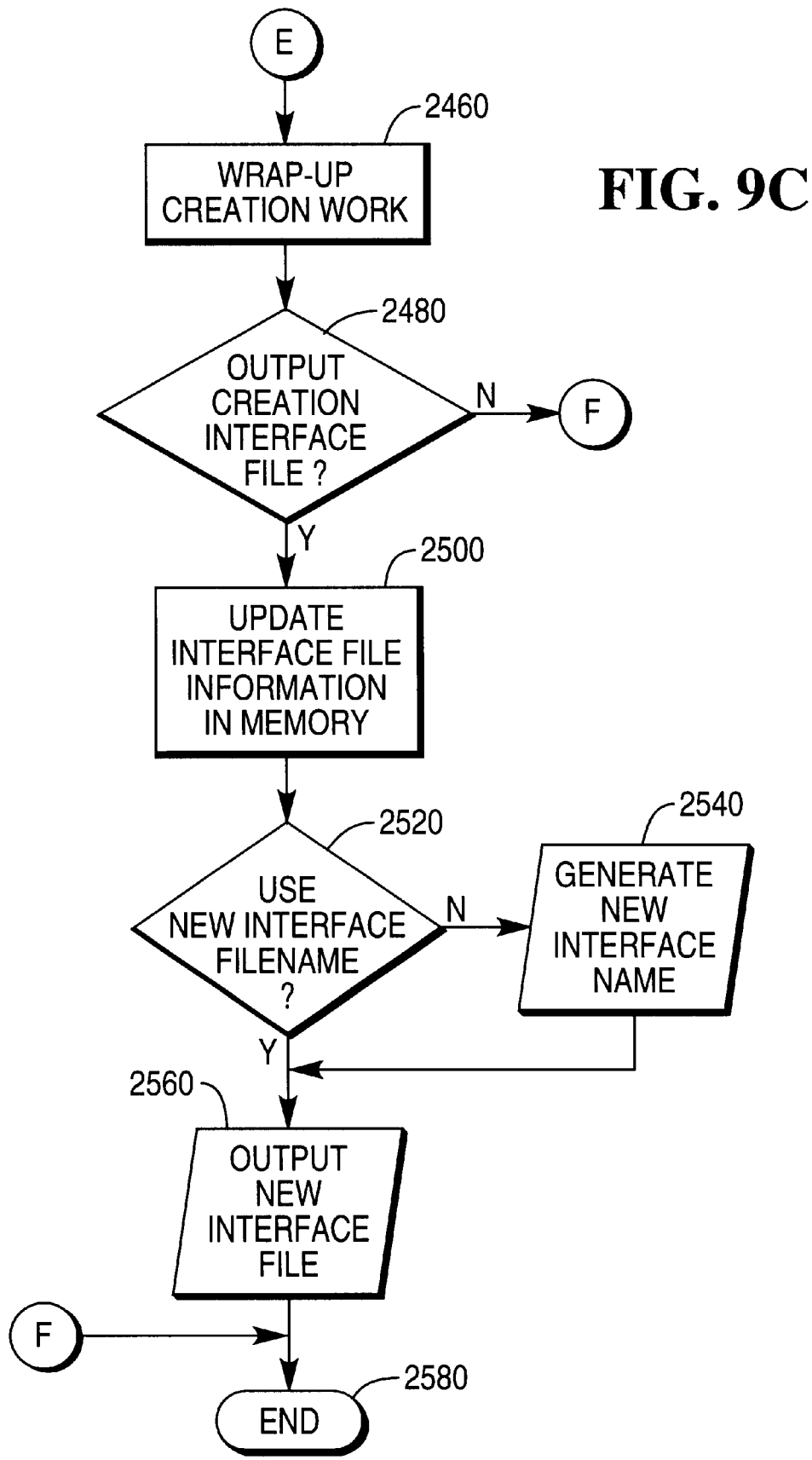

FIGS. 9A through 9C illustrate a process 2001 for creating a DynaKey™ external interface file utilizing a data-mined file associated with a screen design document as shown in FIGS. 8A–8C. Note that the DynaKey™ external interface consists of five ASCII files. The main file is a comma-separated file, and has the file extension ".csv". The <R> tool requires that this file be named "autopos*.csv", where the global character * indicates the version number of the file. For example, the default name of a new interface file will be "autopos1.csv", the next iteration will be "autopos2.csv", and so on. An example of a segment of an "autopos*.csv" file is shown in FIGS. 5A and 5B. The four supporting ASCII files utilized by the <R> tool have the file extensions ".dat", ".key", ".fin", and "0.1$^{st}$". The ".dat" file is a sequential text file that is directly related to the ".csv" file. That is, every non-blank text field for each screen is given a non-zero number in the "*.csv" file. This number is used to indicate the relative position in the "*.dat" file where the actual text appears. The ".key" file is a sequential file with one line for each screen category as shown in FIG. 5C. Each screen category corresponds to a global key, or to another screen set specified in the design document. The ".fin" file is utilized by <B> to maintain an ordered list of the screens that have not been built at the time <B> is terminated. The use of the ".fin" file allows screen construction to continue upon subsequent executions of <B> as if <B> was not terminated during the screen construction process. Since the last entry in the "*.fin" file is a dummy record that indicates the bottom of the stack, this dummy record must still be created by <D>. The "0.1$^{st}$" file contains a single integer entry that corresponds to the integer screen number for the first screen that the <R> will display. Upon termination, <R> may change the integer contained in the "0.1$^{st}$" file to indicate the new first screen to be displayed the next time that the <R> is executed.

The creation of an external interface file is best illustrated by referring back to FIG. 7B. A user would begin the external interface file creation process by selecting the 'File' pull-down menu and further selecting the 'New File' menu item. At this point in the process, the 'Update' pull-down menu items are disabled, and the 'Create' pull-down menu items are enabled. If the second 'Create' menu item is selected, the result resembles the dialog illustrated in FIG. 7B, but with no content in the three list boxes. If the "Create" icon is selected, the contents of the three list boxes change based upon the contents of a data-mined file, and as illustrated for one such data-mined in FIG. 7B. Once the external file is created in memory, a user may save the file to disk using the default file name "autopos1.csv", or different name entered by the user. The 'Save As' item under the 'File' pull-down menu may be selected several times in succession to save the same file under several names before <D> is halted. For example, the user may utilize a file name convention that saves the initial file using the file name "autopos2.csv", but also saves the same file as "autopos.csv". Since "autopos.csv" is the expected default external interface file name, the <R> tool can utilize the new interface file as soon as the <D> tool is terminated. The <R> will display a default color background bitmap and a default receipt background bitmap on the DynaKey™ until these bitmaps are modified within <R> for the particular POS application under development. Each DynaKey™ label will use the icon and/or bitmap that was specified in the design document. In addition, the prototype ELL function assignments, as generated by <D>, will be utilized by <R> in conjunction with the navigation information specified in the design document.

Figure 10A:
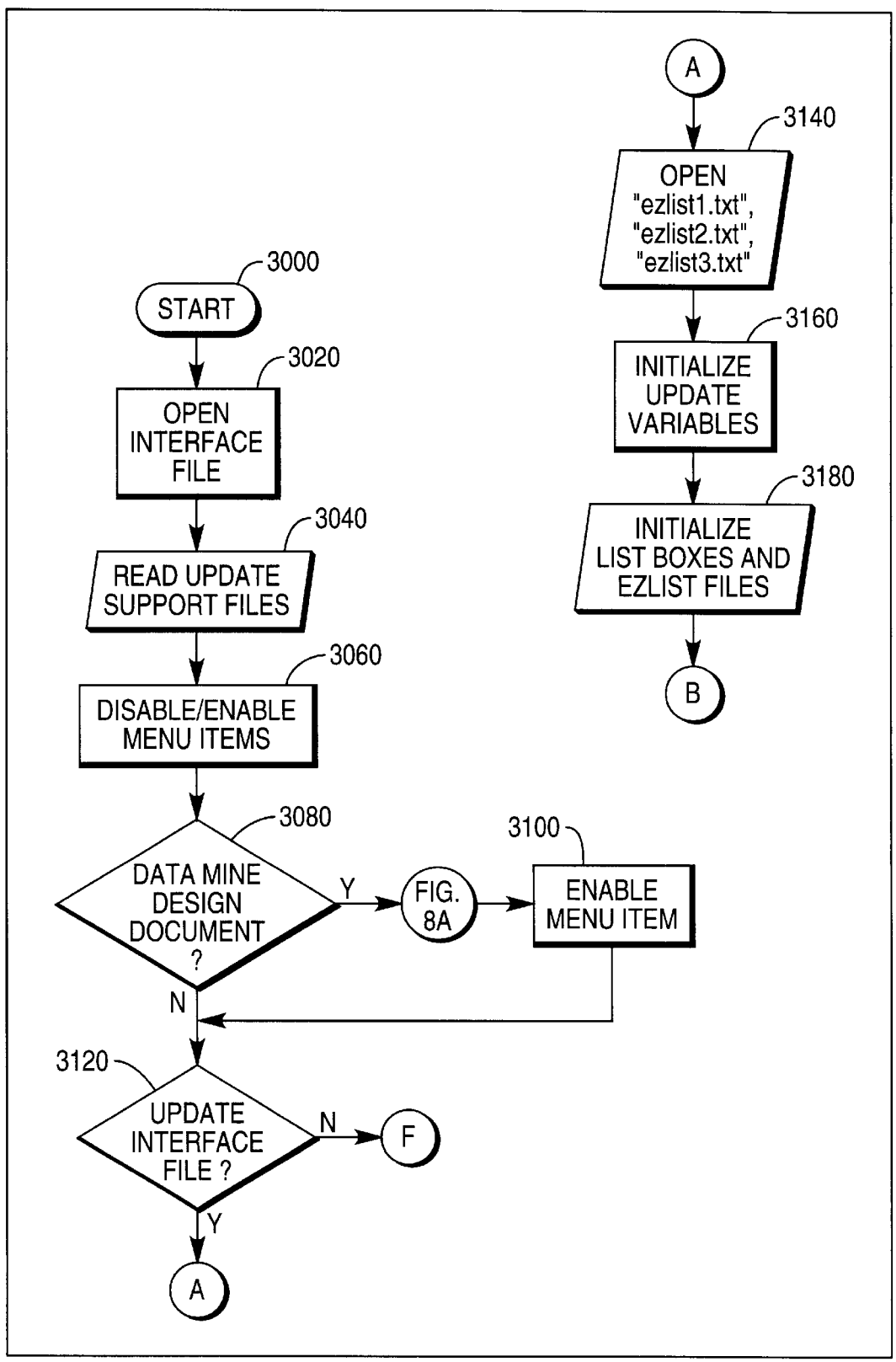
FIGS. 10A through 10D illustrate a process for updating an existing DynaKey™ external interface file utilizing a data-mined file associated with a screen design document.
Figure 10B:
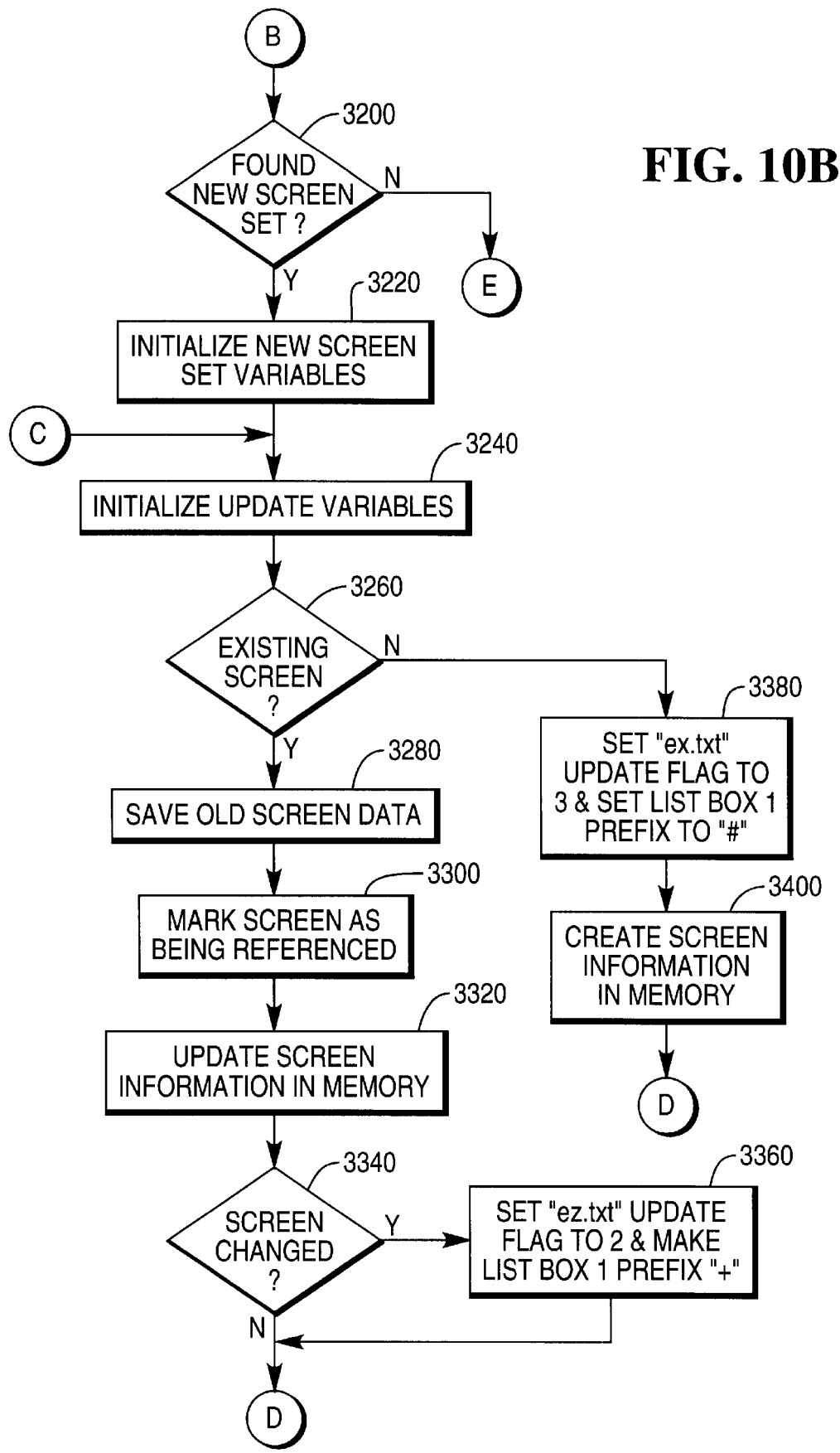
Figure 10C:
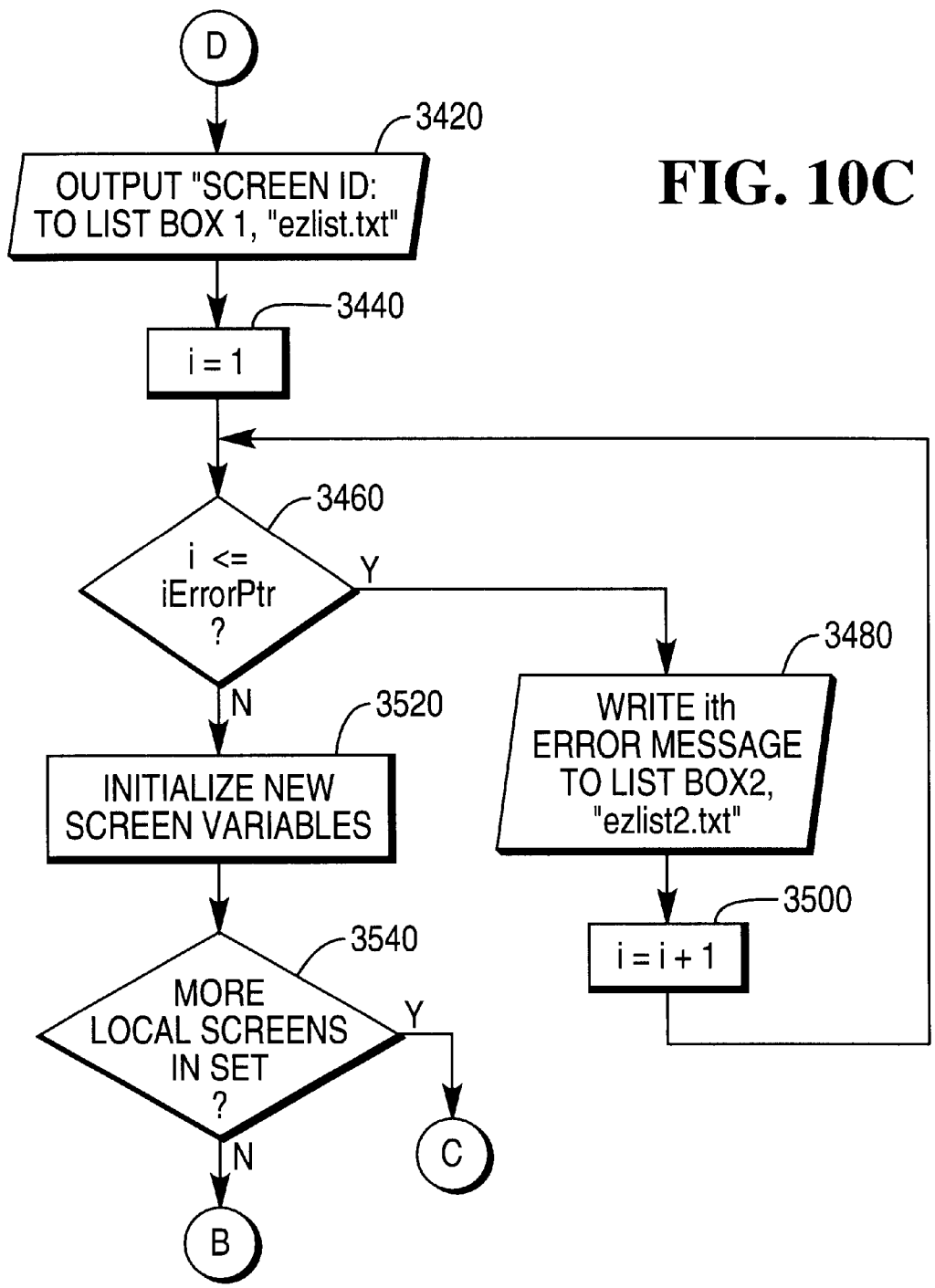
Figure 10D:
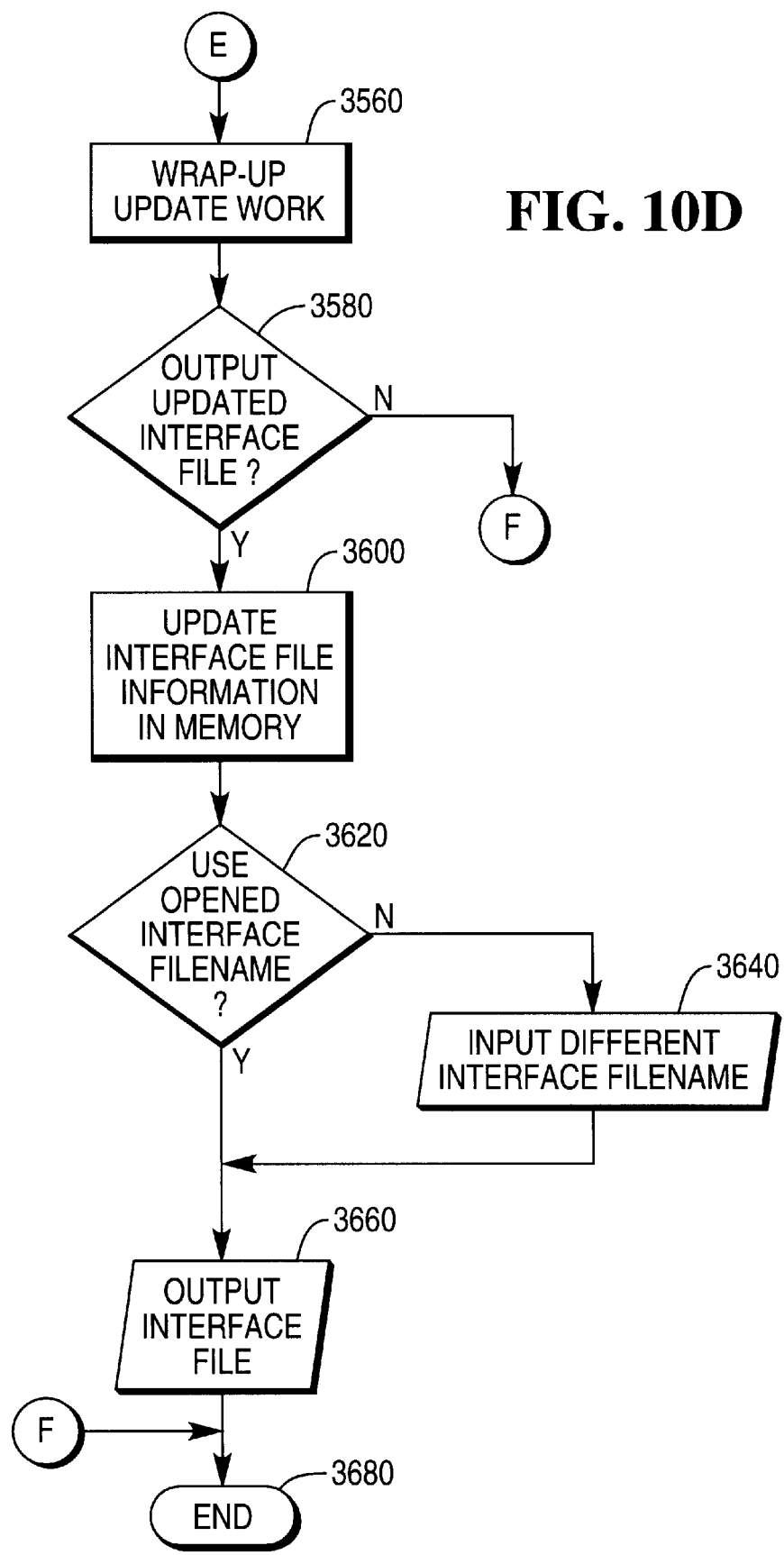

Referring again to FIGS. 9A–9C, a process 2001 for creating a DynaKey™ external interface file utilizing a data-mined file associated with a screen design document is illustrated and described in further detail. The process starts at step 2000 and proceeds to step 2020 where the Microsoft® Visual C++™ program initializes all pull-down menu items. Each of the pull-down menu items are disabled with the exception of the 'New', 'Open', and 'Exit' items under the 'File' menu. At step 2040, the process determines if a new DynaKey™ interface file is being created. This is determined by evaluating if the 'New' item under the 'File' menu has been selected. If a new interface file is not being created, the process proceeds to step 2580 and the process ends. This will occur if the user has chosen to update an existing interface. Updating an existing interface is described below and is shown in FIGS. 10A–10C. If a new interface file is being created, the process proceeds to step 2060. At step 2060, certain supporting files that are required by the <D> tool are read. The names of these files are "keylogic.dat", ez.env", and the previously data-mined file "ez.txt". The "keylogic.dat" file contains ELL function names arranged in alphabetic order. A minimal set of 12 ELL functions are utilized by the <D> tool in conjunction with the creation of a new interface file, although the "keylogic.dat" file typically contains many more ELL function names. The "keylogic.dat" file is loaded into an array, and a search is performed to locate the 12 ELL functions and to find the relative position of each within the array. The "ez.env" file is utilized in conjunction with 21 screen environment variables. The last eleven of these environment variables are related to the static keys that appear on each screen within the design document, but the first 10 are not specified. Therefore, the first 10 are specified in the "ez:env" file. To illustrate the use of the environment variables, refer back to FIG. 5A. The header lines 501 contain an ENVIRONMENT line record that starts with the number "3". The corresponding record 505 illustrates the 21 screen environment variables labeled either "T" or "F", and separated by commas. The last 11 values in the string correspond to the static key specifications contained in table 230 as illustrated in FIG. 2A. Each "Valid" string becomes a "T" and each "Invalid" string becomes "F".

After the support files are read, the process proceeds to step 2080. At step 2080, the status of certain pull-down menu items is changed. The "Exit" menu item of the "File" pull-down menu is enabled, the other "File" menu items are disabled. The "DataMine" item of the "Create" pull-down menu is enabled. If the "ez.txt" file exists in the current <D, B, R, T> file directory, the "Autopos" item is also enabled. If the "ez.txt" file does not exist, it is because the data mining process of FIGS. 8A–8C has not been completed, and the "Autopos" menu item remains disabled. At step 2100, the process determines if the user wants to data-mine a screen design document. If so, the current process is suspended and a new process is initiated as described above and as shown in FIGS. 8A–8C. Upon completing the data mining process shown in FIGS. 8A–8C, the current process continues and proceeds to step 2120. At step 2120, the "Autopos" item of the "Create" pull-down menu is enabled, and the process proceeds to step 2140. Referring back to step 2100, if the user does not want to data mine a screen design document, the process proceeds directly to step 2140. At step 2140, the process determines if the user wants to create a new interface file. If the user does not choose to create a new interface file, the process proceeds to step 2580 and the process ends. If the user does choose to create a new interface file, the process proceeds to step 2160.

At step 2160, three output files named "ezlist1.txt", "ezlist2.txt", and "ezlist3.txt" are opened. These three output files correspond to the three list boxes illustrated in FIG. 7B. At step 2180, certain creation variables such as the "iNewScreenNumber" variable are initialized. This variable keeps tract of the next interface screen number as each new screen is created utilizing the data of the "ez.txt" file. These screen numbers are also utilized by <B> to index the interface screens when a software engineer makes actual ELL assignments and other external interface file work not specified by the Word design document. At step 2200, the list box header information is displayed in the three list boxes as shown in FIG. 7B, and this information is also written to the corresponding disk files, and the process proceeds to step 2220. Step 2220 is the first block of a process loop that utilizes the "ez.txt" file data to process each of the screen sets of the screen design document.

Referring now to FIG. 9B, the process proceeds to step 2220. At step 2220, the process determines if there are any more screen sets to process. This is accomplished by utilizing a function call that contains the prior screen set location within an array containing the "ez.txt" screen information. This prior screen set location was initialized back at step 2180 of the process. The function call performs a sequential search within the "ez.txt" array to find the next location of the next screen set. If it is determined at step 2220 that there are no more screen sets, the process proceeds to step 2460, which is discussed further below. If there are more screen sets to process, the process proceeds to step 2240. At step 2240, the variable "iNewScreenNumber" is incremented by 1. Proceeding to step 2260, the value of the "iNewScreenNumber" variable is stored for future use in one of the "ez.txt" record fields corresponding to the particular "ez.txt" screen. Another process loop begins at step 2280 and continues to step 2440. This process loop is utilized to create the current interface screen corresponding to the data stored in the referenced portion of the "ez.txt" array. This process loop also generates interface screens for any new local screens that are referenced within the navigation sections of the current screen, as well as subsequent screens in the current screen set. For an example, refer back to table 220 as illustrated in FIG. 2A. Note that FIG. 2A illustrates a screen with the "Screen ID:" 201 of "IE.1$a$". The second entry 225 of column 223, labeled "NavigateWO:", indicates the screen to which the application will branch if the corresponding DynaKey™ is pressed when data has not been entered. In this example, the branch is to a screen with the "Screen ID:" of "IE.1.1". Since the referenced "Screen ID:" 225 begins with the same prefix of "IE" as the current "Screen ID:" 201, it is assumed that screen "IE1.1" belongs to the same screen set.

Referring back to FIG. 9B, the process continues at step 2280 where certain screen error variables are initialized. First, an array message pointer that determines the location of an array used to store warning and error messages is initialized. The contents of this array will be stored in an output named "ezlist2.txt" after each screen is processed. Next, the "chNewScreen" variable is initialized to the slot value of the "Screen ID:" slot corresponding to the current screen, and the "~" symbol is appended to this variable if the current screen is the first screen of a screen set. The process then proceeds to step 2300 where the value of the variable "chNewScreen" is written to the first list box 720 as shown in FIG. 7B. The value of the variable "chNewScreen" is also written to an output file named "ezlist1.txt". At step 2320, the creation of the various components of a new screen for the new interface is completed in memory. Also, the local screen numbers of any new screens that must be created by subsequent iterations of the step 2280–2440 loop are placed on the memory stack for later reference.

The actual creation of a screen at step 2320 involves a number of tasks. First, the interface array elements for the current screen being constructed in memory must be initialized. For example, referring back to FIG. 2A, all of the non-DynaKey™ text fields are given a numeric value of zero to indicate that those fields are initially blank. Next, the current screen data is evaluated to see if the "Reference Name:" 203, is either "DKItem", "DKItem2", or "DKList". A corresponding interface screen variable is then set to 1, 2, or 3 respectively. Also, two variables are initialized to indicate "calling" information. One is used to denote the first screen number whose navigational information references the current screen. The other "calling" variable is the number of the "key" causing the transfer to the current screen. This "key" value is a number from 1 to 8 if one of the 8 corresponding DynaKeys™ is pressed, or 9 if the <Enter> key is pressed. For the first screen of any given screen set, the "calling" variables are both initialized set to –1. The <B> tool utilizes the "calling" information when it displays a screen that is to be modified.

Next, a function is called to determine if another screen category has been found. If the current screen is the first screen of a subsequent screen set, then the current screen "Screen Set:" text 202 is placed in the next element of the category array. Referring again to FIG. 5C, each comma delineated entry of each line corresponds to a portion of the array data. Each of these comma delineated entries is described below. Note that the $6^{th}$ line entry as illustrated in FIG. 5C is "Item,Entry,1,1,1,0,0,5". Referring again to FIG. 2A, note that the "Screen Set:" text 202, "Item-Entry" in this case, is hyphenated. In this case, the "Screen Set:" text is parsed to obtain the first and second comma delineated fields, "Item" and "Entry". If the "Screen Set:" text 202 was not hyphenated, then the second comma delineated field would contain "NA". Next, a check is done to see if the screen set name corresponds to one of the static key names. If so, then the third and fourth comma delineated fields of the line entry of FIG. 5C correspond to the row and column number of the static key as shown in table 230 illustrated in FIG. 2A. In this case, the static key name "Item-Entry" is assigned to the static key at row 1, column 1, as shown in table 230. Therefore, the third and fourth comma delineated fields of the $_6$th line entry are "1" and "1". If the screen set name does not correspond to one of the static key names, then the third and fourth comma delineated entries are set to 0. This is illustrated by the $12^{th}$ line entry of FIG. 5C, "Sign_On,NA,0,0,1,1,1,1" as shown in FIG. 5C. The fifth and sixth comma delineated fields are initialized to 0 at this time, but are modified later as described below. The seventh comma delineated field is always 0, unless the screen set being processed is the first screen set. Again, this is illustrated by the $6^{th}$ line entry as illustrated in FIG. 5C. Referring again to the $12^{th}$ line entry as illustrated in FIG. 5C, the seventh comma delineated entry is 1, indicating that this screen set is the first screen of this screen design document. The eighth comma delineated field is initialized to the screen number assigned to the first screen of the screen set if the static key "owns" screens. For static keys that cannot own screens, such as the "Clear" key, the value of –1 is assigned. "Blackboard" screen sets can also own screens, and the value for these screen sets is the first screen number of the set as well. "Blackboard" screen sets are discussed further below.

Continuing with the execution of step 2320 of the process, the text field "Title area (left justify):" 204, as shown in FIG.

2A, is converted to a number. If the design document is written correctly, this process is straight forward. However, in reality, the text specified for this field in the design document may be too long given a particular ASUI font and font size in the <R> tool. Rather than terminating the <D> for such an error, the program will use certain title rules to force the title to fit the allotted field area. The user is informed of the effect of these title rules in the second list box 726 as shown in FIG. 7C. The user can choose to ignore these warning messages and accept the screen interface using the title rule modifications. In this manner, the <R> tool can be immediately invoked after <D> is terminated. Alternatively, the user can make a change to the design document, data-mine the revised design document, and then use the "create" dialog again.

To illustrate an example of the above "Title area (left justify):" problem, refer back to FIG. 7C. In this example, the title field entered was "Item Entry For The ABZ Company In AnyWhere United States Of America". The second list box 726 as illustrated in FIG. 7B shows an entry "Title3:AnyWhere Unit . . . ". In this case, a title rule was used to force the title to fit the title field by truncating the text string, and discarding the remaining text ("AnyWhere United States Of America"). The title rule utilized was rule 3 as indicated by the prefix "Title3:". If the discarded portion of the text string is too long to fit in the second list box 726, as shown in this example, then only a portion of the discarded text string is displayed followed by 3 trailing periods. Once the appropriate title rule, or rules, has been applied, the truncated title is displayed in the second list box 726, and any error or warning text messages are placed in a "CString" message array for later use. The truncated title string is also stored in the next "*.dat" array location in memory, and the memory location value is stored in the title variable for the given interface screen.

In a similar manner, step 2320 of the process also determines the numeric codes for the "Instructional area (left justify):" 205 and "Prompt area:" 206 text fields. The numeric determination work is the same as above, except for the case where the text is a two line instruction. For the case where the length of the first instruction is too long, the instruction is parsed at a word boundary, if possible, and the excess text is inserted at the beginning of the second line. For the case where the length of the second instruction line is too long, portions of the second line may be moved to the end of the first instruction line. Another text field that is processed at step 2320 is the identification text field 345 as illustrated in FIG. 3A. The construction is done by concatenating several "ez.txt" fields, and by utilizing the integer screen number field. This is accomplished utilizing the "CString.Format" object-oriented command.

The next task accomplished at step 2320 is to transform the "ez.txt" DynaKey™ table information for the current screen into the interface format stored within memory. This transformation begins by considering only the DynaKey™ label and "Icon/.bmp" text for a particular DynaKey™ on the current screen. Specifically, a loop is executed to process all of a screen's DynaKey™ non-navigation information. Should the "ez.txt" record field information for a particular DynaKey™ label have a null text value, then a Boolean interface record field is set to "TRUE", indicating that the particular DynaKey™ is not used. This is done instead of initializing the screen's DynaKey™ label and "Icon/.bmp" fields. On the other hand, if a DynaKey™ label is non-blank, then this variable is set to "FALSE", and the two subordinate fields must be subsequently initialized. For the "Icon/.bmp" case, the DynaKey™ name from the design document screen is stored directly in the interface fields if the text field is non-blank. Otherwise, an "NA" value is stored. For the DynaKey™ label, the processing is much the same as for the instruction parsing with rules being used that both enforce the two-line limit, as well as the line limit of <R>. For each DynaKey™ rule used, a message will be saved in the message array for subsequent use, and the edited message is displayed in the second list box 726 as shown in FIG. 7C.

The next task accomplished at step 2320 is to perform a conversion of the navigation information. This process combines the DynaKey™ and <Enter> key navigation information by treating the <Enter> key as the "$9^{th}$" DynaKey™ on each screen. To better understand this process, refer back to the first line of record 504 as shown in FIG. 5A and table 220 as shown in FIG. 2A. The conversion process takes the label and navigation information for DynaKey™ "1" from table 220 and creates the first line of record 504 in memory. The resulting string, "2,1,23,24,QUANTI~1,T,76,1,10,5,0,0,77,6,0,0", encapsulates all of the information related to DynaKey™"1". The substring "76,1,10,5,0,0,77,6,0,0" of the above string is used to encode the ELL function designation as well as the screen navigation. The "76,1,10,5,0,0" portion of the substring represents the "navigate with data" case ("NavigateW:"), and the "77,6,0,0" substring represents the "navigate without data" case ("NavigateWO:"). In addition, the number "76" denotes the relative position of the ELL function name that appears in the "keylogic.dat" file. By referring to FIG. 6A, it can be seen that the ELL function name is "Prototype_DynakeyW". Likewise for the number "77", the ELL function name is "Prototype_DynakeyWO". The "1,10" portion of the substring above indicates the number of digits that can be entered in conjunction with using DynaKey™ 1, with the default range from 1 to 10 digits. The "5,0,0" and "6,0,0" portions of the substrings indicate the three types of branching. The first digit of each of the substring portions corresponds to the primary local branch, the second number corresponds to the auxiliary branch, and the third number corresponds to the first screen of the next screen set if applicable. For example, for the "navigate without data" case for DynaKey™ 1, as illustrated in FIG. 2A, the branch 225 is a local branch to "IE.1.1", and the assigned integer screen number is 6. For the "navigate with data" case, the branch 224 points to "IE.1a", and the corresponding screen number is 5. Since there are no other local branching options for DynaKey~ 1 in either case, the auxiliary screen branch number for both cases is 0. Since the function of DynaKey™ 1 in this example always loops back to the same "Change Quantity" function, the third digit is also 0 in both cases.

In contrast to the above example, the record 506, as shown in FIG. 5A, corresponds to the <Enter> key. For the "navigate with data" case, the seventh comma delineated field value is 4, and corresponds to the item "usBlackboardW". This means that the branch to screen "PW.1a", as specified in FIG. 2A, is a branch to another set within the design document. Furthermore, the "usBlackboardW" variable in header lines 501 indicates an unsigned variable by the "us" name prefix. Consequently, each bit in the variable can be a 1 or 0 depending upon whether or not the first screen in the $i^{th}$ "blackboard" set can be accessed or not. In short, since the "PW.1a" set is the second set referenced in the design document, then bit 2 in this variable is set to 1. Therefore, the "usBlackboardW" value, displayed in base 10, is $2^2$ or 4.

The next task accomplished at step 2320 is to create the interface information corresponding to the navigation information for a given screen. First, a loop is executed 9 times, once for each DynaKey™ and once for the <Enter> key. For each of the DynaKeys™ that are not utilized for a given screen, no further processing is needed as a Boolean variable has already been initialized, indicating whether or not a given DynaKey™ is used. For example, the ELL numeric values are initialized to correspond to one of the following ELL error functions: "A_Error_DataW", "A_Error_DataWO", A_Error_EnterW", or "A_Error_EnterWO". These error functions are overridden as the screen context dictates. However, some of these initial assignments will typically remain unchanged. To illustrate, refer back to FIG. 6A. Notice that for the third DynaKey™ ("VOID_C"), the "A_Error_DataW" ELL function is still listed. The reason for this is that no navigation path has been specified for the "with" data ("NavigateW:") case for DynaKey™ 3 as shown in table 220 of FIG. 2A. If DynaKey™ 3 is pressed when the <R> is running, the "DKError" screen shown in FIG. 3D will be displayed over the current DKItem screen. The user must press the "Continue" DynaKey™ in order to destroy the error screen and to allow the <R> to continue. Once the ELL initialization is completed, the navigation information for the screen must be extracted by parsing the screen's stored information. This is accomplished for any given "key" by searching within the screen's stored DynaKey™ or <Enter>key navigation information string. This search must be done for both the "NavigateW:" and "NavigateWO:" strings. For each case, a subsequent line of text is stored in one of the next two "CString" variables: "chBranchW" or "chBranchWO". Then, the remaining text following each of these two lines is stored similarly in "chRestBranchW" and "chRestBranchWO".

The processing for "chBranchW" and "chBranchWO" is different when the branching is to a different screen set. This branching is known as "blackboard" branching. In order to determine if the "blackboard" branching applies, the stored "ez.txt" records are searched for a match between the "chBranchW" and "chBranchWO" text, and another screen's "Screen ID:" text. If a match is found, then a determination is made to see if the current screen set name is different than the other screen's set name. If the set names are different, then the branch is a "blackboard" branch. In this case, the current branch, "chBranchW" for example, must be used to change the appropriate "usBlackboard" interface variable to turn on the proper bit. Therefore, a function is used to check within a "blackboard" table if the set name has already been referenced by a previous screen branch. If not, the new set name is added, and its relative memory location is used to place a 1 in the "blackboard" bit corresponding to the "key's" navigational text. Otherwise, the existing "blackboard" table location is used to set the "blackboard" bit to 1. And finally, the "chBranchW" and "chBranchWO" variables are set to null if either branch is a "blackboard" branch. Next, the "chRestBranchW" and "chRestBranchWO" strings must be parsed to extract all of the individual branches contained within the strings. Two respective loops are used to accomplish this task. First, the "blackboard" determination method for each extracted line of navigational text is similar to the method explained above for the "chBranchW" and "chBranchWO" text. Next, for each different "blackboard" branch found, the corresponding "usBlackboardW" or "usBlackboardWO" variable is updated again by turning on more bits. Then, the respective "extra-branch" array element is set to null, indicating no additional translation work is required for this branch. The line extracted from the "chRestBranchW" or "chRestBranchWO" variables is stored in the next "extra-branch" array element for each local branch. Note that a user may place comments within the navigation text enclosed by parenthesis. To prevent such comments from causing errors, the line of navigational text returned via parsing is searched for a ".". If a period is found, then the line is assumed to be a navigational text line. Otherwise, the line is ignored, and a warning message is stored in the message array.

At this point in the process, all default ELL assignments have been made, and "blackboard" branches have been evaluated. Also, the "NavigateW:" and "NavigateWO:" screen branching text has been isolated and stored in separate variables. The primary local branches are stored in the "chBranchW" and "chBranchWO" variables respectively. For example, for DynaKey™ 1 as shown in FIG. 2A, the "IE.1a" text is stored in "chBranchW" and the "IE.1.1" text is stored in "chBranchWO" during the first iteration of this navigational processing loop. Also, the remaining branches for the "NavigateW:" and "NavigateWO:" cases are stored in two respective "extra-branch" arrays. For this example, the two arrays have no navigational text stored in any of their elements.

The next task accomplished at step 2320 is to convert the branching text associated with the current screen set to integer screen numbers. One difficulty with this conversion process arises from the fact that the branching text may reference screens that have not yet been created, or that have not yet been referenced. Another difficulty concerns the method used for defining the sequence for numbering the screens. The process described uses a top-down numbering scheme to process navigational text. That is, the $1^{st}$ new screen number is assigned to the case where DynaKey™ 1 is pressed "without" data ("Navigate WO:"), and the $2^{nd}$ new screen number is assigned to the case where DynaKey™ 1 is pressed "with" data ("Navigate W:"). The $3^{rd}$ and $4^{th}$ new screen numbers are assigned to the "without" and "with" data cases for DynaKey™ 2, and so on for the remaining DynaKeys™ 3–8. The $1^{th}$ and $18^{th}$ new screen numbers are assigned in a similar manner to the <Enter> key. These branches are called primary branches, and any other branches are called auxiliary branches. After all of the primary branch screen numbers are assigned, the sequence continues for auxiliary branches. If any of the above branches do not exist, then that number is assigned to the next branch. This number assignment scheme permits a natural correspondence between the lower and higher screen numbers relative to the logical flow of the screen set design. Another design consideration to note is that the new screens must be placed on the stack beginning with the highest number. This insures that the first new screen is popped off the stack first, thereby preserving the top-down numbering scheme for creating the new screens.

The next task accomplished at step 2320 is to transform the numeric navigational information for subsequent processing. This is accomplished by utilizing several two-dimensional arrays: "iPtrW[][]", "iBranchesW[][]", "iLastButtonW[][]", "iPtrWO[][]", "iBranchesWO[][]" and "iLastButtonWO". The first dimension of these arrays correspond to the number of the DynaKey™ (1–8) or the <Enter> key (9). Position 1 of the second dimension indicates the "primary" branch and position 2 is for the auxiliary branch. Since the user may assign more than one auxiliary branch by mistake, the second dimension limit is set to be a higher number. This enables additional new screens to be generated even though there is no existing branch in the current screen. Continuing with the transformation process, the "iPtrW[i][0]" array elements are assigned a non-zero value corresponding to the location of the 37 chBranchW" text within the stored "ez.txt" file. Next, the "iLastButtonsW[i][0]" array element is set to the value of i, where i denotes the i$^{th}$ key of the current screen. If the "chBranchW" text corresponds to the current "Screen ID:" text string, no new screen needs to be created. Therefore, the "iBranchesW[i][0]" value will be zero minus the current screen number. If the screen branch is to a new screen, then there are two situations to consider. First, if the runtime screen number associated with the stored "ez.txt" record is still −1, then a new screen number must be created, and the "iBranchesW[i][0]" element is set to 1. Otherwise, the new screen number is already on the stack, and it must not be put on the stack again. Therefore, as before, a negative value is placed in "iBranchesW[i][0]". This time, however, the existing screen number is not the same as the current screen number. Instead, it is another screen number for a screen not yet created, stored as the runtime screen number of another "ez.txt" record. There is a problem with this transformation method when the contents of "chBranchW" are not null, and no corresponding "Screen ID:" text can be found. This constitutes an error and must be reported. Referring again to FIG. 2A and FIG. 7C, assume that the branch 236 for the <Enter> key is typed as "PW.2a" instead of "PW.1a" in FIG. 2A. This will cause the message "Branch Rule1:PW.2a" to appear in the second list box 726 as shown in FIG. 7C, indicating that the branch text "PW.2a" is incorrect. Also, the branch text "PW.2a" appears under the "Missing SCR Screens" sub-heading in the third list box 727 as shown in FIG. 7C, indicating that there is no existing screen named "PW.2a" in the "ez.txt" file. These messages appear in the list boxes after all of the new interface screens have been created in memory. The same transformation process is subsequently repeated for the primary "without" data case and the auxiliary "with" and "without" data cases.

At this point in the process, no new screen numbers have been generated nor has any new screen information been pushed on the stack. These tasks are completed after all the navigational "key" text has been converted into numeric data. Therefore, the numeric conversion process is continued for the rest of the DynaKeys™ and for the <Enter> key. Once all of the navigational "key" text is replaced with numbers stored in various arrays, the remainder of the navigational transformation work can be completed in two phases. In the first phase, new screen numbers must be generated for all branches to other screens within the current screen set, where each of these transfer screens are not part of the new screen interface being constructed in memory.

To explain the generation of new screen numbers, consider the numbers associated with the primary screen branching. These particular screen numbers are generated starting with the "without" and "with" data cases for DynaKeys™ 1–8 followed by the <Enter> key. This is accomplished utilizing a loop that is executed 9 times. Within that loop, a check is done to see if the "iBranchesWO[i][0]" value is 1, which indicates a new screen. If the value is 1, then the new screen number variable is incremented by 1 and the value is stored in "iBranchesWO[i][0]" in place of the previous dummy value. Also, the corresponding runtime screen number field in the "ez.txt" stored record is given the same value. This particular "ez.txt" location is easy to find since it is kept in the "iPtrWO[i][0]" element. This process is repeated for the "with" data case. In this manner, the generation of new screen numbers is completed for the primary branching. The generation of new auxiliary screen branching numbers is accomplished in a similar manner.

The final processing of the screen navigational text requires two tasks. First, the stack must be updated with new screen information. Second, the ELL and branching interface fields for the current screen being constructed in memory must be updated to complete the creation of the current interface screen. First, note that the auxiliary branches must be put on the stack before the primary branches to insure that the interface creation process uses the top-down structure method for subsequent new local screens. The stack record includes the location of the stored "Screen ID:" record corresponding to the new screen, the new screen number, the current screen number, and the relative number of the "key" that results in branching. When the record is later popped from the stack, the stack record items are utilized to populate the fields of the new interface screen. The "iBranchesW[][]" array is utilized to determine if the stack should be updated. If the value of an "iBranchesW[][]" element is positive, then that array element contains the new screen number and the stack is updated. If the array element value is negative, then the stack is not updated, but the array element value is changed to the value of the existing screen number by multiplying it by −1. In short, after the stack work is completed, each of the positive "iBranchesW[][]" array elements represent actual screen numbers.

The final navigational task is to complete the construction of the interface screen for the current screen. This task is accomplished by executing a loop 9 times for each of the DynaKeys™ and the <Enter> key. The loop determines if the "iBranchesW[i][0]" value is greater than zero, or if the "usBlackboardW[i]" field is non-zero. If either is true, then the i$^{th}$ "key" has branching information associated with the "with" data case. The "ELL" name is changed to the appropriate numeric prototype value, and the branching fields for the primary, auxiliary, and "blackboard" screen branching are updated. The prototype "ELL" names choices are "Prototype_DynakeyW", "Prototype_DynakeyWO", "Prototype_EnterW", and "Prototype_EnterWO", as shown in FIG. 6A. The 21 environment variables are then updated. The first 10 variables in the environment are set to default values obtained from the "ez.env" file. The last 11 variables, corresponding to the 11 static keys, are set according to the values contained in table 230 as shown in FIG. 2A. The value for a static key with a property marked "Valid" or "Invalid" is "F" or "T" respectively. Note however that it is possible for a property to have been typed incorrectly during the screen design process. Therefore, the default value for any given static key is set to "Invalid". This will result in an error message being stored in the message array, and that error message will be displayed in the second list box 721, as shown in FIG. 7B, when the screen information is processed. At this point in the process, the new interface screen is now resident in memory and the new local screen information is on the stack.

Referring back to FIG. 9B, the process now proceeds to step 2340, and a message pointer variable "i" is set to 1. At step 2360, the process begins an error message reporting loop to determine if there are any more error messages. If the value of the "iErrorPtr" is greater than "i", there exists another error message, and the process proceeds to step 238. At step 2380, the error message is written to the "ezlist2.txt" file, and is displayed in the second list box 720 as shown in FIG. 7C. The process then proceeds to step 2400 where the value of "i" is incremented by 1, and the process loops back to step 2360. Referring back to step 2360, if the value of the "iErrorPtr" is not greater than "i", then there are no more error messages to write to the "ezlist2; .txt" file, and the process proceeds to step 2420. At step 2420, the next set of new screen information is popped off the stack and utilized to initialize the screen variables for the next screen. These variables include the new screen number, the "calling"

screen number, and the "calling" key number. At step 2440 the process determines if there are any more new screens in the current screen set that must be created. If so, the process loops back to step 2280 and the screen creation process steps are repeated for the new screen. If there are no more new screens left to be created in the screen set, the process loops back to step 2220, and the process determines if there is another screen set to process. If there are no more screen sets to process, the process proceeds to step 2460.

At this point in the process, there are no further screens to create, and the process begins a subprocess to complete the screen interface creation. The first task is to display the non-header information in the third list box 722 as shown in FIG. 7B. The entries illustrated in list box 722 are generated using a loop to sequence through all the stored "ez.txt" file records to determine if each "screen-generation" field has been set to "TRUE". The design document page number and the "Screen ID:" are displayed under the "Orphan SCR Screens" subheading for any unreferenced, or orphan screens. The "Screen ID:" of any screens referenced, but not found in the design document, are displayed under the "Missing SCR Screens" subheading. An example of this is illustrated by the contents of the third list box 727 as shown in FIG. 7C. The text "Page:6" and "IE.1.1" is displayed under the "Orphan SCR Screens" subheading, and the text "PW.2a" is displayed under the "Missing SCR Screens" subheading. This text is also written to the "ezlist3.txt" file.

The process then proceeds to step 2480 where the process determines if the new interface stored in memory should be saved to disk. If not, the process proceeds to step 2580 and the process ends. If the new interface is to be saved, the process proceeds to step 2500. At step 2500, the following interface files are updated in memory. First, the "blackboard-"fields (fields 5 and 6 as shown in FIG. 5C) of the "*.key"file are updated. Each existing "blackboard" set name is used to locate the corresponding position within the "*.key" array. When a match is found, field 5 of the "*.key" array is set to 1 to indicate that the set is a "blackboard" screen set. Next, the relative position within the "blackboard" array is placed in field 6 for the same "*.key" record. The relative position is zero-based, meaning that the first location is zero. After the ".key" array is updated to reflect the existing "blackboard" screen sets, additional lines must be added to the "*.key" file. For example, a static key name from the design document may not be associated with any screens. This information is added to the "*.key" array. Referring back to FIG. 5C, note that the 3$^{rd}$ line entry is for the "Clear" key. Note also that the "Clear" is located at row 3 (3$^{rd}$ field), column 1 (4$^{th}$ field) of the DynaKey™, as illustrated in FIG. 1C and by table 230 of FIG. 2A. The 8$^{th}$ comma delineated field for the "Clear" key is set to −1, indicating that when the key is pressed in <R>, there is no transfer made from the current screen. Continuing with step 2500, the ".key" file elements are sorted alphabetically. This is done so that the <B> tool can open the ".key" file and dynamically display the categories within one of the available menus. This allows the categories to be referenced when printing the screen set, or to display the first screen of a screen set for subsequent updating by <B>. Finally, additional records are added to the ".key" file as needed to fill a specified number of record entries. Referring back to FIG. 5C, notice that that 11 record entries labeled "Not_Used" are added. These entries are unused "blackboard" sets. Additional record entries are added if the total number of "*.key" records are still less than the specified number of records. These records will have row (3$^{rd}$ field) and column (4$^{th}$ field) value of zero, the "blackboard" fields will be zero, and the 8$^{th}$ field value will be set to −1.

Continuing with step 2500, the array that contains the static key information is also updated. As described above, the "ez.txt" data-mining file stored the static key information in an array, and each static key was assigned a numeric ELL function for the "with" and "without" data cases. The default assignments were "A_Error_Static_KeyW" and "A_Error_Static_KeyWO" respectively. At this point in the process, some of these assignments must be changed to "Prototype_StaticW" and "Prototype_StaticWO". That is, for each "*.key" record that indicates that the static key owns a screen, the ELL function assignment will be changed to "Prototype_StaticWO". For the case of the "Clear" key, both prototype static assignments will be made since the "Clear" key can be pressed in both cases. Proceeding to step 2520, the process determines if the default interface filename ("autopos1") should be used. If so, the process proceeds to step 2560. If not, the process proceeds to step 2540, the user is allowed to enter a new interface filename, and the process proceeds to step 2560. At step 2560, the new interface is saved to disk, the process proceeds to step 2580, and the interface creation process ends.

At this point, a few final remarks about the interface creation process 2001 will prove useful. One issue relates the way in which <R> accesses the external interface file screens in a first prototype $P_1$. For example, some "with" and "without" data navigation paths branch to more than one local screen within a screen set. A problem then arises as to how the <R> tool can branch to each of these local screens using "dummy" ELL function logic. The first step in the solution to this problem is to place a call to another function. This other function then determines the next screen branch, based upon a "branching number", within each non-error prototype function. The "branching number" value is typically one, resulting in the first branch being used for a particular DynaKey™ or <Enter> key. This branch is either the primary local screen branch or the first "blackboard" set branch. This numeric screen is then stored as the primary branch. To avoid destroying a screen's original information, a copy of the screen information is modified. Should the user want to branch to a second, or subsequent branch, the "." key is pressed repeatedly. The number of times that the "." key is pressed will determine the branch number to be used in conjunction with the "PROTOTYPE" command line argument. In short, the "PROTOTYPE" command line argument causes the "." key to not be processed as it normally would be. After each screen transfer, the "branching number" is again reset to 1. When the <B> tool is utilized to assign actual static key ELL functions, the branching will then be based upon <R>'s context, as is done in the final production system.

Another issue relates to the way in which static key branching is implemented within a first prototype $P_1$. In a production system, static key branching is dependent upon certain pre-conditions being met. For example, a "Payment" static key will normally cause a branch to a tendering screen, but a typical pre-condition would require that the sale amount not be zero. To solve this problem, the static key ELL functions do not enforce pre-conditions, thereby allowing total screen navigation. The implementation of the <D> tool requires some minor changes to be made to the <B> tool disclosed in the "Wagner" patent. One change requires a menu item to be added to <B>'s File menu to print the "static" information sheets of the interface file. Another change requires <B> to have another menu containing selections that allow the user to modify the static key ELL function designations, and to specify global set branching.

FIGS. 10A through 10D illustrate a process 3001 for updating an existing DynaKey™ external interface file utilizing a data-mined file associated with a screen design document as shown in FIGS. 8A–8C. Referring back to FIG. 7D, note that the first list box 730 shows a list of screens identified by "Screen ID:". If a screen has been modified during an update session, the "Screen ID:" is preceded by the symbol "+". If a new screen has been added to the interface, the "Screen ID:" is preceded by the symbol "#". Screens that are unmodified are listed without a prefix symbol. The third list box 732 as shown in FIG. 7D has an additional subheading, "Unreferenced SCR screens" 734. This subheading is utilized to list any screens in the existing interface that are found, but not referenced by other screens. These screens are left in the interface, but are not utilized by the <R> tool. The data displayed in the three list boxes 730, 731 and 732 are the result of a simple update to the word design document illustrated in FIG. 2A. In this example, the title of the screen has been changed to "Sales Screen", and the function of the $4^{th}$ DynaKey™ has been moved to the $8^{th}$ DynaKey™. Also, the design document version umber has been changed to "1.1", and the list boxes are labeled "Update". The first list box 730 shows the prefix "+" for screen "IE.1a" indicating that it has been modified. The second list box 731 shows any errors and warnings resulting from the update process. Each message is preceded by the current design document page, followed by the previous design page to facilitate manual checking. Also, the list box 731 contains the contents of any modified fields as well as the original contents of those fields. In this example, the page title was changed, and the function of the $4^{th}$ DynaKey™ was also changed. The new and old titles follow the "Title(New):" and "Title(Old):" prefixes respectively. The new and old navigation text for the $4^{th}$ DynaKey™ follow the "New 1:" and "Old: 1:" prefixes respectively. In summary, these characteristics of the list boxes allow a user to see the results of the screen modifications.

The update mode of the <D> presents some unexpected challenges. First, a potential problem exists if the user tries to use <R> with a previous version of the interface file. The problem arises because a user may add and delete entries from the "keylogic" file as new ELL function names are added and/or deleted. When this is done, the encoded ELL function designations are changed as the particular interface is saved to disk because the relative locations of the ELL names do not always remain the same within the "keylogic.dat" file. Therefore, in order to be used by <B>, <T> or <R>, each of the previous versions of the interface file must be input and saved by <B> when the "keylogic.dat" file is changed. A second problem exists when new screen sets are added to the interface during the update cycle. Since the actual ELL functions determine branching based upon the context of <R> and the relative position of the "blackboard" bits that are turned on for each screen, the existing "blackboard" bit designations must not be changed. When <D> opens the ".key" file during an update, the "blackboard" array is populated. This allows the new "blackboard" bits to be assigned without disturbing the old assignments. However, the relative bits no longer correspond to the order referenced within the design document. A third problem relates to the way in which <D> handles the ELL function designation when a DynaKey™ label is changed. In most cases, a modification to a DynaKey™ label will not result in a change to the ELL function designation. However, for the case where the labels for two DynaKeys™ are interchanged, the ELL designations must be interchanged as well. In this case, the user would utilize the printed audit trail to allow <B> to modify the ELL designations. For a new DynaKey™ label, the prototype ELL designation will be assigned. A fourth problem relates to the way in which <D> handles static key changes. If the static key is only a change to the assigned text label, the corresponding "Screen Set:" text will also be changed to agree with the new static key name, but the "Screen ID:" value remains the same. The net effect is to modify the "*.key" entry to reflect the new static key label. If the functions for two static keys are interchanged, the "*.key" entry is modified to reflect the interchanged row and column values. If a static key is dropped from a screen, ".key" entry is changed to "Not_Used".

Referring again to FIG. 10A, the interface update process 3001 begins at step 3000. At step 3020, an existing interface file is opened by selecting "Open" from the "File" pull-down menu. The user selects a file to open, the file is read into memory and two tables are populated. The first table contains a list of "Screen ID:" values, and the second table contains the "ez.txt" pages that correspond to those "Screen ID:" values. These tables are used later to determine whether the current "ez.txt" screen is an old or new screen, and to find the page of a screen in the previous version of the screen design document. At this point in the process, the two "Create" pull-down menu items are disabled and the two "Update" pull-down menu items are enabled. Once the interface file is opened, the user would select the "Autopos" menu item to open an update dialog screen. Next, the user clicks on the "Update" dialog button, and the three list boxes 730, 731 and 732 are filled as shown in FIG. 7D.

Continuing with step 3020, the five interface files ("*.csv", "*.dat", "*.key", "*.fin", and "*.$1^{st}$") are read and stored in memory. At step 3040 the "keylogic.dat" and "ez.env" supporting files are read and stored in memory. Also, the "ez.txt" design document file is read and stored in an array, and the "ex.txt" supporting fields are initialized. At step 3060, the two "Create" pull-down menu items are disabled, and the two "Update" pull-down menu items are enabled. At step 3080, the process determines if the screen design document should be data mined. If so, the update process is suspended, and the data mining process described above and shown in FIGS. 8A–8C is invoked. After the document is data mined, the process continues at step 3100. At step 3100, the "Autopos" menu selection is enabled, and the existing interface can be updated with the current "ez.txt" file. The process then proceeds to step 3120. Referring back to step 3080, if the user chooses not to data mine the screen design document, the process proceeds to step 3120. At step 3120, the process determines if the user interface file should be updated. If the user chooses not to update the interface file, the process proceeds to step 368 and the process ends. If the user chooses to update the interface file by clicking on the "Update" dialog button, the process proceeds to step 3140.

At step 3140, the process opens the three output files named "ezlist1.txt", "ezlist2.txt" and "ezlist3.txt". These three output files correspond to the three list boxes 730, 731 and 732 as shown in FIG. 7D. At step 3160, the update variables are initialized. These variables are the next new screen number, the stack pointer position for the next new screen information pushed on the stack, and whether or not certain interface files have been changed. At step 3180, the list box header information is displayed in the three list boxes as shown in FIG. 7D, and this information is also written to the corresponding disk files, and the process proceeds to step 3200. Step 3200 is the first block of a loop whose purpose is to process screens sets, using the "ez.txt" data stored in memory, until there are no more screens to consider. At step 3200, the process determines if a new screen set has been found. If no new screen sets are found, the process proceeds to step 3560, which is discussed further below. If there are new screen sets, the process proceeds to step 3220. At step 3220, a variable that identifies any new screens is set by appending the prefix symbol "+" to each new screen, as shown in list box 730 of FIG. 7D, and the process proceeds to step 3240.

The process steps 3240–3540 comprise a loop that is utilized to modify an existing interface screen within an existing interface screen within the current screen set, or to create a new interface screen. As these steps are completed, the process displays the current "Screen ID:" text in the first list box 730, and any associated error and warning messages in the second list box 731 as shown in FIG. 7D. Also, the warning and error messages are stored in an array, and later written to the "ezlist2.txt" file after each screen is created or updated. At step 3240, the screen update variables are initialized. This initialization includes setting the "Screen ID:" prefixes to a blank"" for each unmodified screen. These prefixes will be updated later in the process to a "+" if the screen is updated, or a "#" if the screen is a new screen. Also, an update flag contained within the "ez.txt" screen record is set to 1 to indicate that a screen is unchanged.

This flag will be changed later to indicate if the screen has been updated. Finally, the location of the "Screen ID:" value within the "chSCR_IDs" table is stored in memory. If a particular "Screen ID:" is not found, the value is set to −1.

Proceeding to step 3260, the process determines if the current "ez.txt" screen is an existing screen. If the screen does not exist, the process proceeds to step 3380. At step 3380, the "ez.txt" record update flag value is changed from 1 to 3, indicating that the screen is a new screen. Also, the new screen number is stored within the appropriate "ez.txt" record, and the "Screen ID:" prefix displayed in list box 730 is changed to "#". At step 3400, the new screen information is created in memory. This process is identical to the process described in detail by step 2320 of process 2001. Once the screen information is created in memory, the process proceeds to step 3420. The description of process step 340 is discussed in further detail below.

Referring back to step 326, if the current "ez.txt" screen is an existing screen, the process proceeds to step 3280. At step 3280, the old interface screen text and branching information is saved in memory, and the process proceeds to step 3300. At step 3300, the array variable "b Referenced Screens" is set to TRUE to indicate that the old "ez.txt" screen is referenced in the new design document. Proceeding to step 3320, the screen interface is updated in memory, and the error and warning messages are displayed in the second list box 731 of FIG. 7D. The corresponding, unedited messages are also saved in a message array for later use. The screen update process is similar to the screen creation step 2320 of process 2001, but with some important differences in relation to the contents of the ".dat" file. First, if any old text is changed, the new text overrides the old text in the same position in the ".dat" file. Second, if the old text field was blank, then the new text field is placed in the next available location in the "*.dat" file. Third, if the new text field is blank, then the "*.dat" file entry is marked as empty, thereby leaving the entry available for subsequent new text fields. Another difference between the update and creation processes is that the screen class may change during the update process. For example, a "DKItem" screen may change to a "DKItem2" screen. In that case, a function call must be made to handle this modification, as well as to place a message in the screen's message array. Also, the message must be displayed in the second list box 731 as shown in FIG. 7D. The final difference between the update and creation processes is best illustrated by referring back to FIG. 2A. Assume that the screen design document has been updated, but all of the navigational fields are have remained the same. For example, the previous interface contains a branch for the "without" data case for DynaKey™ 1. Nevertheless, the existing screen number corresponding to "Screen ID: IE.1.1" needs to be placed on the stack once in order for the top-down structure processing to work properly. This problem is handled by utilizing a Boolean stack variable with the "ez.txt" records. Whenever an interface screen is in the process of being created or updated, this Boolean variable is set to "TRUE", indicating that the record can be viewed as already being on the stack. Recall that in the screen creation process, new screen numbers are placed on the stack utilizing a loop that looks at positive array values in an array such as "iBranchesWO[][]". In the screen update process, the negative values that denote existing screen numbers are changed to positive values utilizing a similar loop. But these existing screen numbers are put on the stack once, in the same manner as the new screen information, and the associated Boolean stack variable is set to "TRUE". In this manner, the screen processing will operate properly because when the stack is popped, the process determines if the screen is a new screen or an existing screen. In short, all of the top-down branching is covered when branches are made to new screens or existing screens.

Once the screen information has been updated in memory, the process proceeds to step 3340. At step 3340, the process determines if the "ez.txt" record has resulted in any changes to the existing interface record. If the only change in the "ex.txt" file is a change to the page number, the process ignores the change, and the process proceeds to step 3420. If the process detects any substantive changes to the "ez.txt" file record, the process proceeds to step 3360. At step 3360, the update flag in the "ez.txt" record is changed to "2" to indicate that the screen has been modified, and the first list box 730 prefix for this screen entry is changed to "+". The process then proceeds to step 3420.

At step 3420, the "Screen ID:" text, including its associated prefix and suffix, is displayed in the first list box 730 as shown in FIG. 7D. At step 3440, a message pointer variable "i" is set to 1, and the process proceeds to step 3460. At step 3460, the process begins an error message reporting loop to determine if there are any more error messages. If the value of the "iErrorPtr" variable is greater than "i", there exists another error message, and the process proceeds to step 3480. At step 3480, the error message is written to the "ezlist2.txt" file, and is displayed in the second list box 731 as shown in FIG. 7D. For new screens, the error and warning messages will be the same. However, if any text rules are utilized to make the text conform to <R>'s line length limits, the word "Modify" is added to the text to indicate that the text string has been abbreviated. The process then proceeds to step 3500 where "i" is incremented by 1, and the process loops back to step 3460.

Referring back to step 3460, if the value of the "iErrorPtr" is not greater than "i", then there are no more error messages to write to the ezlist2.txt" file, and the process proceeds to step 3520.

At step 3520, the next set of new screen information is popped off the stack and utilized to initialize the screen variables for the next screen. These variables include the new screen number, the "calling" screen number, and the "calling" key number. At step 3540, the process determines if there are any more screens in the current screen set that must be updated. If so, the process loops back to step 3240, and the screen update process steps are repeated for these screens. If there are no more screens left to be updated in the screen set, the process loops back to step 3200, and the process determines if there is another screen set to process. If there are no more screen sets to process, the process proceeds to step 3560.

At this point in the process, there are no further screens to update, and the process begins a subprocess to complete the screen interface update. The first task is to display the non-header information in the third list box 732 as shown in FIG. 7D. The entries illustrated in list box 732 are generated using a loop to sequence through all the stored "ez.txt" file records to determine if each "screen-update" field has been set to "TRUE". The design document page number and the "Screen ID:" are displayed under the "Orphan SCR Screens", "Missing SCR Screens" and "Unreferenced SCR Screens" subheadings for any orphaned, missing or unreferenced screens respectively. This text is also written to the "ezlist3.txt" file. The function of step 3560 is similar to step 2460 of process 2001, but with one difference. This difference is that the static key ELL function assignments are left unchanged for those static key names that were not updated. If there are any new static key names, the update process is the same as the creation process in that prototype ELL function assignments are made. Once the update process is complete, the process proceeds to step 3580. At step 3580, the process determines if the updated interface stored in memory should be saved to disk. If not, the process proceeds to step 3680 and the process ends. If the updated interface is to be saved, the process proceeds to step 3600. At step 3600, the following interface files are updated in memory. First, the "blackboard" fields (fields 5 and 6 as shown in FIG. 5C) of the ".key" file are updated. Each existing "blackboard" set name is used to locate the corresponding position within the "*.key" array. When a match is found, field 5 of the "*.key"array is set to 1 to indicate that the set is a "blackboard" screen set. Next, the relative position within the "blackboard" array is placed in field 6 for the same "*.key" record. The relative position is zero-based, meaning that the first location is zero. After the ".key" array is updated to reflect the existing "blackboard" screen sets, additional lines must be added to the "*.key" file. For example, a static key name from the design document may not be associated with any screens. This information is added to the "*.key" array. Continuing with step 3600, the ".key" file elements are sorted alphabetically. This is done so that the <B> tool can open the ".key" file and dynamically display the categories within one of the available menus. This allows the categories to be referenced when printing the screen set, or to display the first screen of a screen set for subsequent updating by <B>. Finally, additional records are added to the ".key" file as needed to fill a specified number of record entries. The array that contains the static key information is also updated.

Proceeding to step 3620, the process determines if the opened interface filename should be used. If so, the process proceeds to step 3660. If not, the process proceeds to step 3640, the user is allowed to enter a new interface filename, and the process proceeds to step 3660. At step 3660, the updated interface is saved to disk, the process proceeds to step 3680, and the process ends.

While the present invention is disclosed in the context of a presently preferred embodiment, it will be recognized that a wide variety of implementations may be employed by persons or ordinary skill in the art consistent with the above discussion and the claims that follow below.

We claim:

1. A method of creating and updating a graphical user interface in a computer system, the method comprising:

creating a screen design text document comprising a plurality of text entries and a plurality of associated tables describing at least one screen page of a graphical user interface;

data-mining the screen design text document to extract screen information and create an index of each screen page;

processing the data-mined segment file to produce an external interface file describing the graphical user interface; and displaying the graphical user interface on a video display.

2. The method of claim 1 wherein at least one entry is associated with a screen name, at least one entry is associated with a screen key and at least one entry is associated with a screen branch.

3. The method of claim 1 wherein the step of data-mining further includes the step of automatically creating a screen set file.

4. The method of claim 1 wherein the screen design text document includes branching information for static keys.

5. The method of claim 4 wherein the screen design text document includes branching information for dynamically programmable keys.

6. The method of claim 5 wherein the step of data-mining further includes the step of creating a dynamically programmable key index and a static key index.

7. The method of claim 1 wherein the external interface file includes entry level logic (ELL) functions.

8. The method of claim 1 wherein the external interface file is readable by a run-time system.

9. A system for creating and updating a graphical user interface in a computer system comprising:

means for creating a screen design text document comprising a plurality of text entries and a plurality of associated tables describing at least one screen page of a graphical user interface;

means for data-mining the screen design text document to extract screen information and create an index of each screen page;

means for processing the data-mined segment file to produce an external interface file describing the graphical user interface; and means for displaying the graphical user interface on a video display.

10. The system of claim 9 wherein at least one entry is associated with a screen name, at least one entry is associated with a screen key and at least one entry is associated with a screen branch.

11. The system of claim 9 wherein the means for data-mining is further for automatically creating a screen set file.

12. The system of claim 9 wherein the screen design text document includes branching information for static keys.

13. The system of claim 12 wherein the screen design text document includes branching information for dynamically programmable keys.

14. The system of claim 13 wherein the means for data-mining is further for creating a dynamically programmable key index and a static key index.

15. The system of claim 9 wherein the external interface file includes entry level logic (ELL) functions.

16. The system of claim 9 wherein the external interface file is readable by a run-time system.

* * * * *